US011132977B2

United States Patent
Canberk et al.

(10) Patent No.: US 11,132,977 B2
(45) Date of Patent: Sep. 28, 2021

(54) FADE-IN USER INTERFACE DISPLAY BASED ON FINGER DISTANCE OR HAND PROXIMITY

(71) Applicant: Snap Inc., Santa Monica, CA (US)

(72) Inventors: Ilteris Canberk, Venice, CA (US); Jonathan M. Rodriguez, II, Los Angeles, CA (US); Yu Jiang Tham, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/700,400

(22) Filed: Dec. 2, 2019

(65) Prior Publication Data
US 2020/0211500 A1 Jul. 2, 2020

Related U.S. Application Data

(60) Provisional application No. 62/785,486, filed on Dec. 27, 2018.

(51) Int. Cl.
*G09G 5/10* (2006.01)
*G02B 27/01* (2006.01)
(Continued)

(52) U.S. Cl.
CPC ........... *G09G 5/10* (2013.01); *G02B 27/0172* (2013.01); *G06F 3/011* (2013.01); *G06F 3/044* (2013.01);
(Continued)

(58) Field of Classification Search
CPC ........ G02B 27/0172; G02B 2027/0118; G02B 2027/0178; G06F 3/011; G06F 3/013;
(Continued)

(56) References Cited

U.S. PATENT DOCUMENTS 5,103,085 A * 4/1992 Zimmerman ........... G01S 17/06
250/214 B
9,330,606 B2 5/2016 Barnhoefer et al.
(Continued)

FOREIGN PATENT DOCUMENTS

WO 2010062479 A1 6/2010

OTHER PUBLICATIONS

International Search Report and Written Opinion for International Application No. PCT/US2019/063998, dated Mar. 9, 2020 (dated Mar. 9, 2020)—11 pages.

*Primary Examiner* — Stacy Khoo
(74) *Attorney, Agent, or Firm* — Culhane Meadows PLLC; Stephen J. Weed

(57) ABSTRACT

An eyewear device includes an image display and an image display driver coupled to the image display to control a presented image and adjust a brightness level setting of the presented image. The eyewear device includes a user input device including an input surface on a frame, a temple, a lateral side, or a combination thereof to receive from the wearer a user input selection. Eyewear device includes a proximity sensor to track a finger distance of a finger of the wearer to the input surface. Eyewear device controls, via the image display driver, the image display to present the image to the wearer. Eyewear device tracks, via the proximity sensor, the finger distance of the finger of the wearer to the input surface. Eyewear device adjusts, via the image display driver, the brightness level setting of the presented image on the image display based on the tracked finger distance.

20 Claims, 19 Drawing Sheets

(51) Int. Cl.
   *G06F 3/01*      (2006.01)
   *G06F 3/044*     (2006.01)
(52) U.S. Cl.
   CPC .............. *G02B 2027/0118* (2013.01); *G02B 2027/0178* (2013.01); *G06F 2203/04108* (2013.01); *G09G 2320/0626* (2013.01); *G09G 2354/00* (2013.01)
(58) Field of Classification Search
   CPC .............. G06F 3/044; G06F 3/04847; G06F 2203/0339; G06F 2203/04108; G09G 5/10; G09G 2320/0626; G09G 2354/00
   See application file for complete search history.

(56) References Cited

U.S. PATENT DOCUMENTS

| | | | |
|---|---|---|---|
| 10,310,632 B2 | 6/2019 | Nirjon et al. | |
| 2009/0256814 A1* | 10/2009 | Chung | G06F 3/0488 345/173 |
| 2011/0194029 A1 | 8/2011 | Herrmann et al. | |
| 2011/0227868 A1* | 9/2011 | Chen | G06F 3/044 345/174 |
| 2012/0169236 A1 | 7/2012 | Kim | |
| 2015/0109218 A1* | 4/2015 | Satou | G06F 1/3265 345/173 |
| 2015/0338924 A1* | 11/2015 | Watanabe | G02B 27/017 345/156 |
| 2016/0026255 A1* | 1/2016 | Katz | H04N 5/23222 345/156 |
| 2016/0370931 A1* | 12/2016 | Sakamoto | G09G 3/3648 |

* cited by examiner

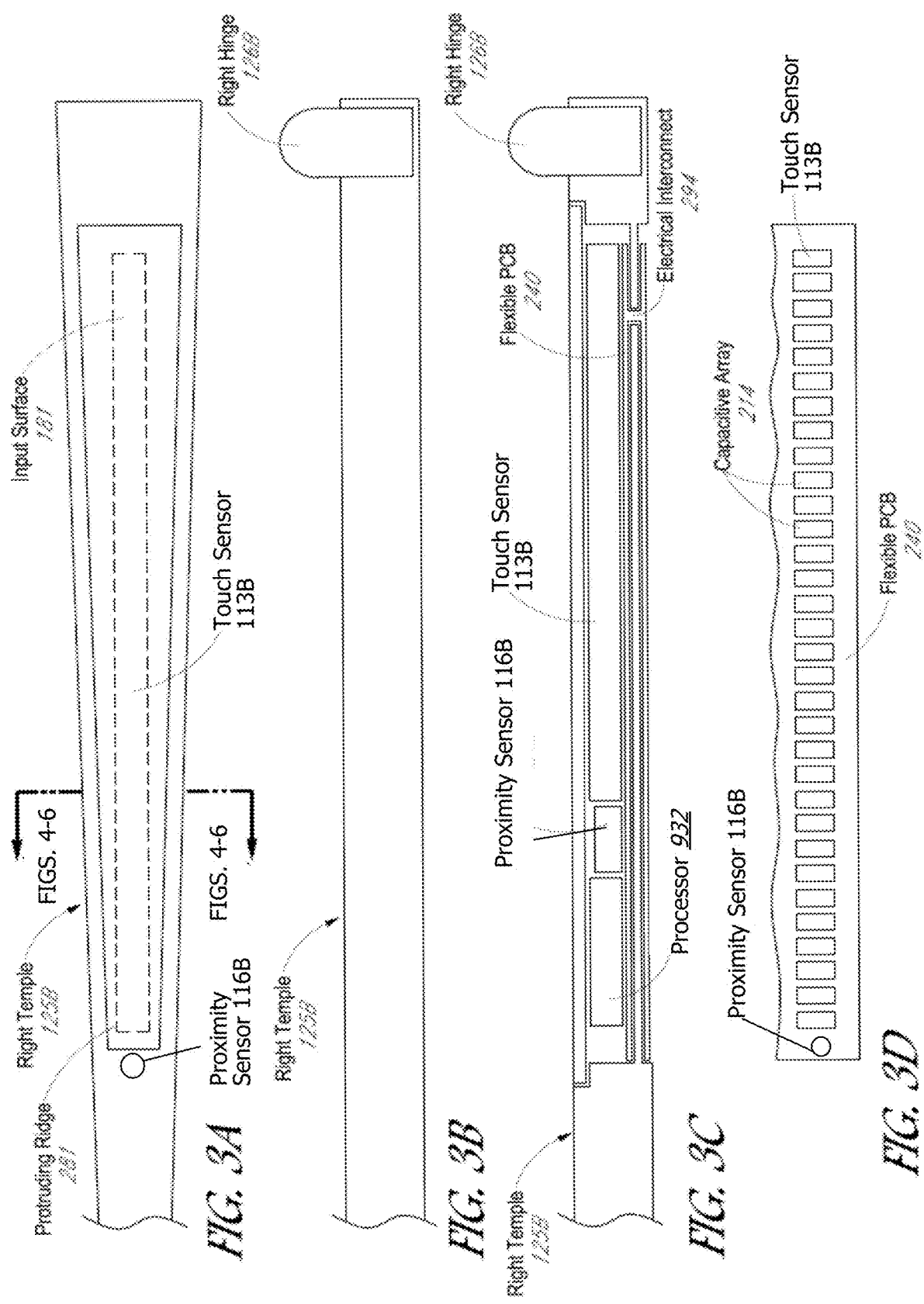

FIG. 3E

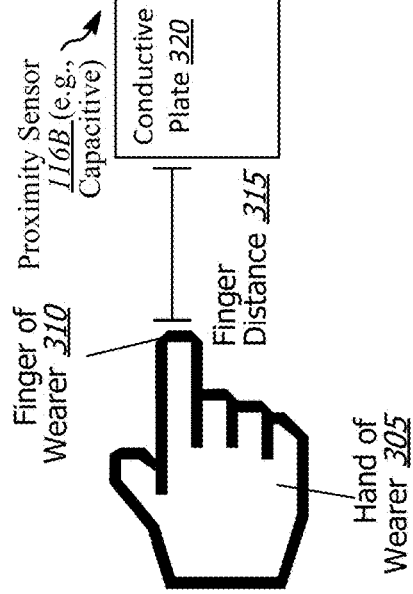

FIG. 3F

| Finger Distance Range 355 | Brightness Level 360 |
|---|---|
| 0 to 2 centimeter (cm) – Minimum Distance Range 355A | 5 – Maximum Bright State (e.g., Relative/Compared Luminous flux or Luminance) 360A |
| 2.1 to 4 cm 355B | 4 (e.g., Relative/Compared Luminous flux or Luminance) 360B |
| 4.1 to 6 cm – Medium Distance Range 355C | 3 – Medium Bright State (e.g., Relative/Compared Luminous flux or Luminance) 360C |
| 6.1 to 8 cm 355D | 2 (e.g., Relative/Compared Luminous flux or Luminance) 360D |
| 8.1 to 10 cm 355E | 1 (e.g., Relative/Compared Luminous flux or Luminance) 360E |
| Greater than 10.1 cm – Maximum Distance Range 355F | 0 – Maximum Dark State (e.g., Relative/Compared Luminous flux or Luminance) 360F |

Brightness Table 350

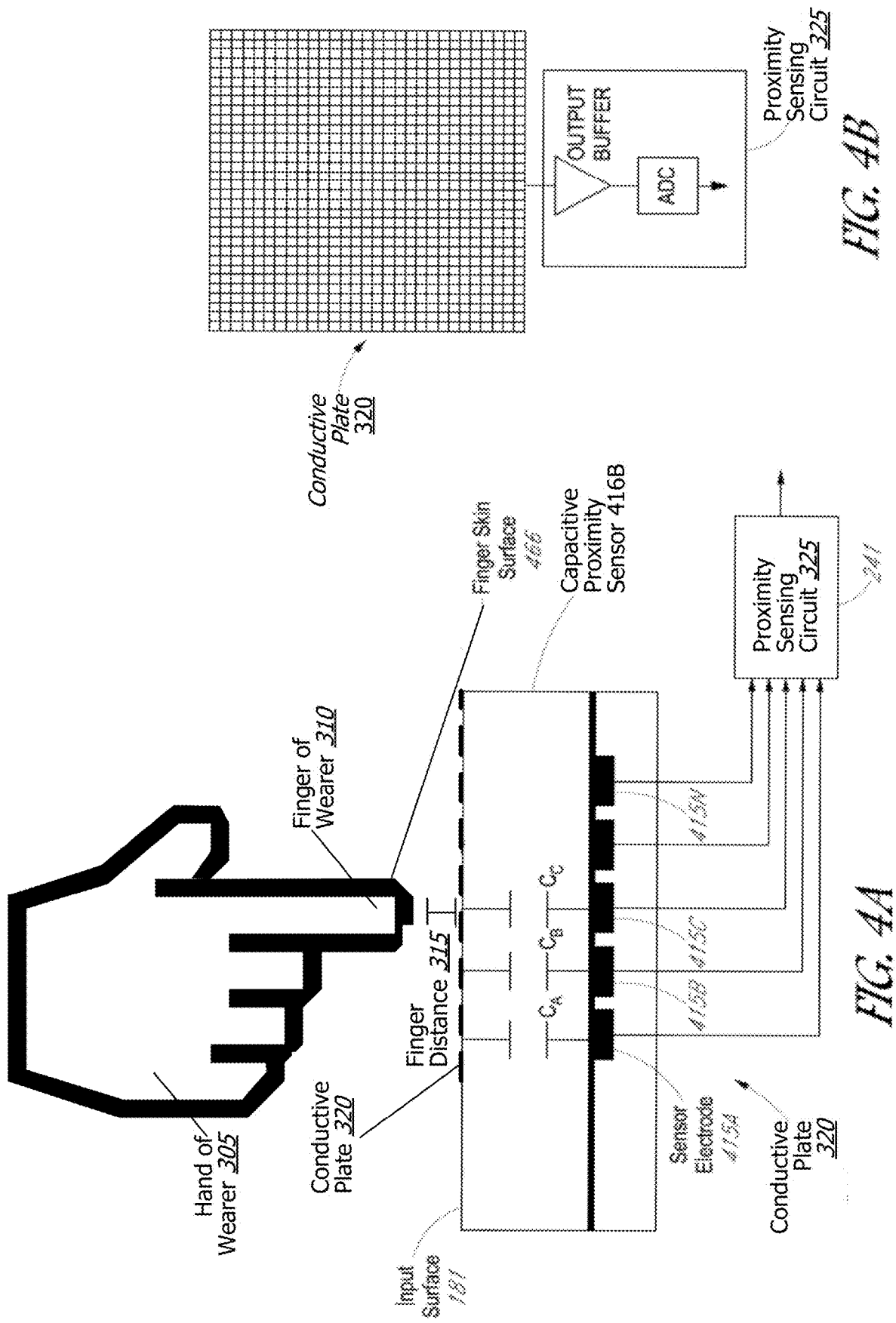

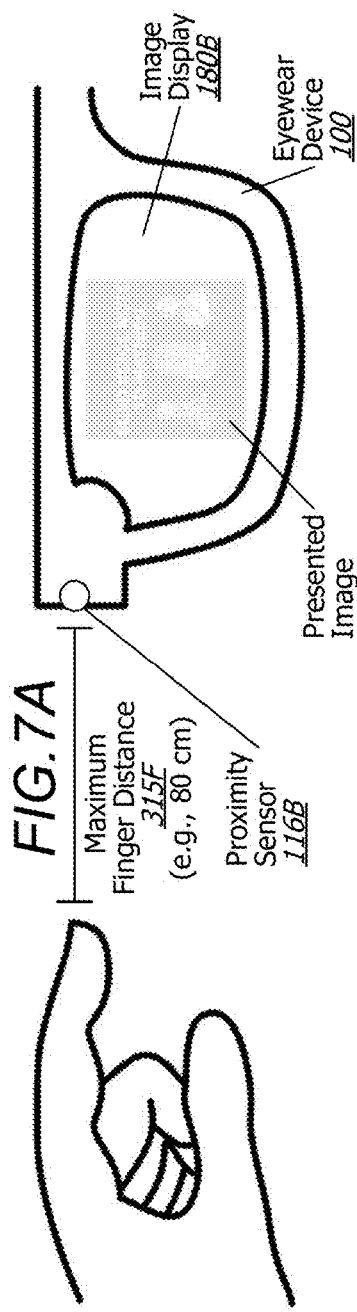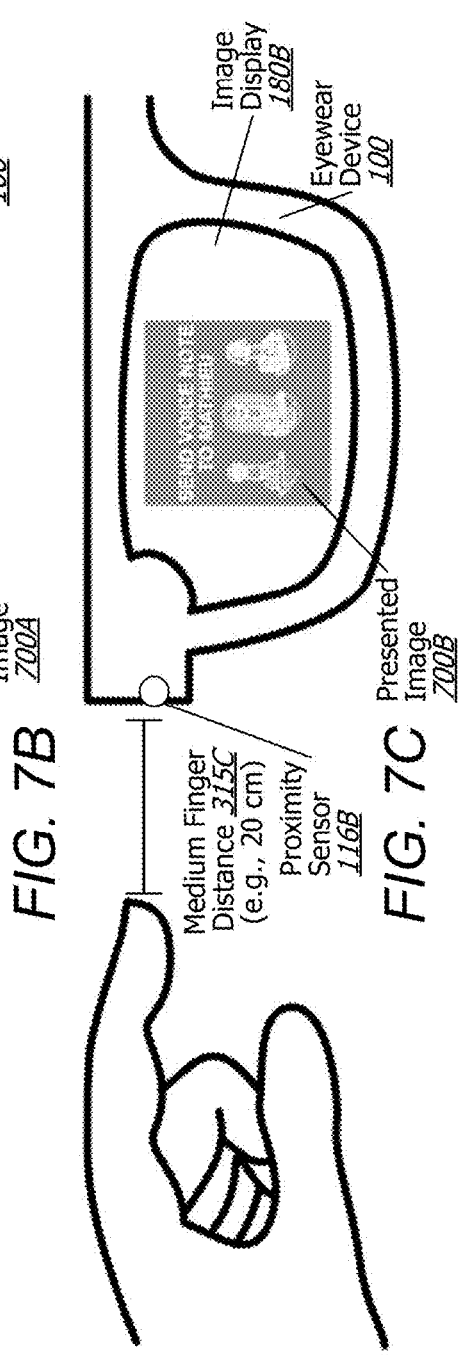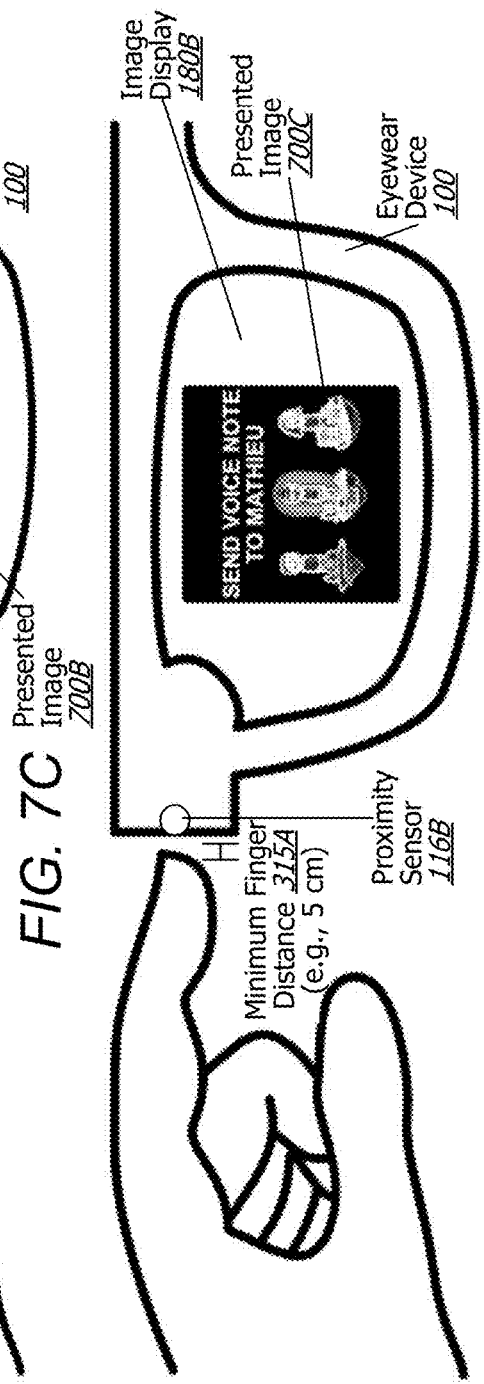

FADE-IN USER INTERFACE DISPLAY BASED ON FINGER DISTANCE OR HAND PROXIMITY

CROSS-REFERENCE TO RELATED APPLICATIONS

This application claims priority to U.S. Provisional application Ser. No. 62/785,486 entitled FADE-IN USER INTERFACE DISPLAY BASED ON FINGER DISTANCE OR HAND PROXIMITY, filed on Dec. 27, 2018, the contents of which are incorporated fully herein by reference.

TECHNICAL FIELD

The present subject matter relates to wearable devices, e.g., eyewear devices, and techniques to adjust brightness level settings of presented images based on proximity detection to a user input device (e.g., touch sensor).

BACKGROUND

Wearable devices, including portable eyewear devices (e.g., smartglasses, headwear, and headgear), necklaces, and smartwatches and mobile devices (e.g., tablets, smartphones, and laptops) integrate image displays and cameras. A graphical user interface (GUI) is a type of user interface that allows users to interact with an electronic device through graphical icons and visual indicators such as secondary notation or finger touch gestures, instead of a text-based user interfaces, typed command labels, or text navigation.

BRIEF DESCRIPTION OF THE DRAWINGS

The drawing figures depict one or more implementations, by way of example only, not by way of limitations. In the figures, like reference numerals refer to the same or similar elements.

FIG. 3A shows an external side view of a temple of the eyewear device of FIG. 1C depicting another capacitive type touch sensor and proximity sensor.

FIG. 3B illustrates an external side view of a portion of the temple of the eyewear device of FIGS. 1C and 3A.

FIG. 3C illustrates an internal side view of the components of the portion of the temple of the eyewear device of FIGS. 1C and 3B with a cross-sectional view of a circuit board with the proximity sensor, the touch sensor of FIG. 1C, and a processor.

FIG. 3D depicts the capacitive array pattern formed on the circuit board of FIG. 3C to receive the finger skin surface inputted from the user.

FIG. 3E is an example proximity sensor circuit to track finger distance of a finger, including a conductive plate and a proximity sensing circuit coupled to a processor that includes a brightness table to fade-in a presented image.

FIG. 3F is a brightness table that includes finger distance ranges and associated relative brightness levels for each respective finger range, in human readable format.

FIGS. 4A and 4B show operation and a circuit diagram of a proximity sensor depicting a capacitive proximity sensor example.

FIGS. 7A, 7B, and 7C show operation of the proximity fade-in system that includes the eyewear device with the proximity sensor examples of FIGS. 1A-C, 4A-B, 5, and 6.

DETAILED DESCRIPTION

Figure 1A:
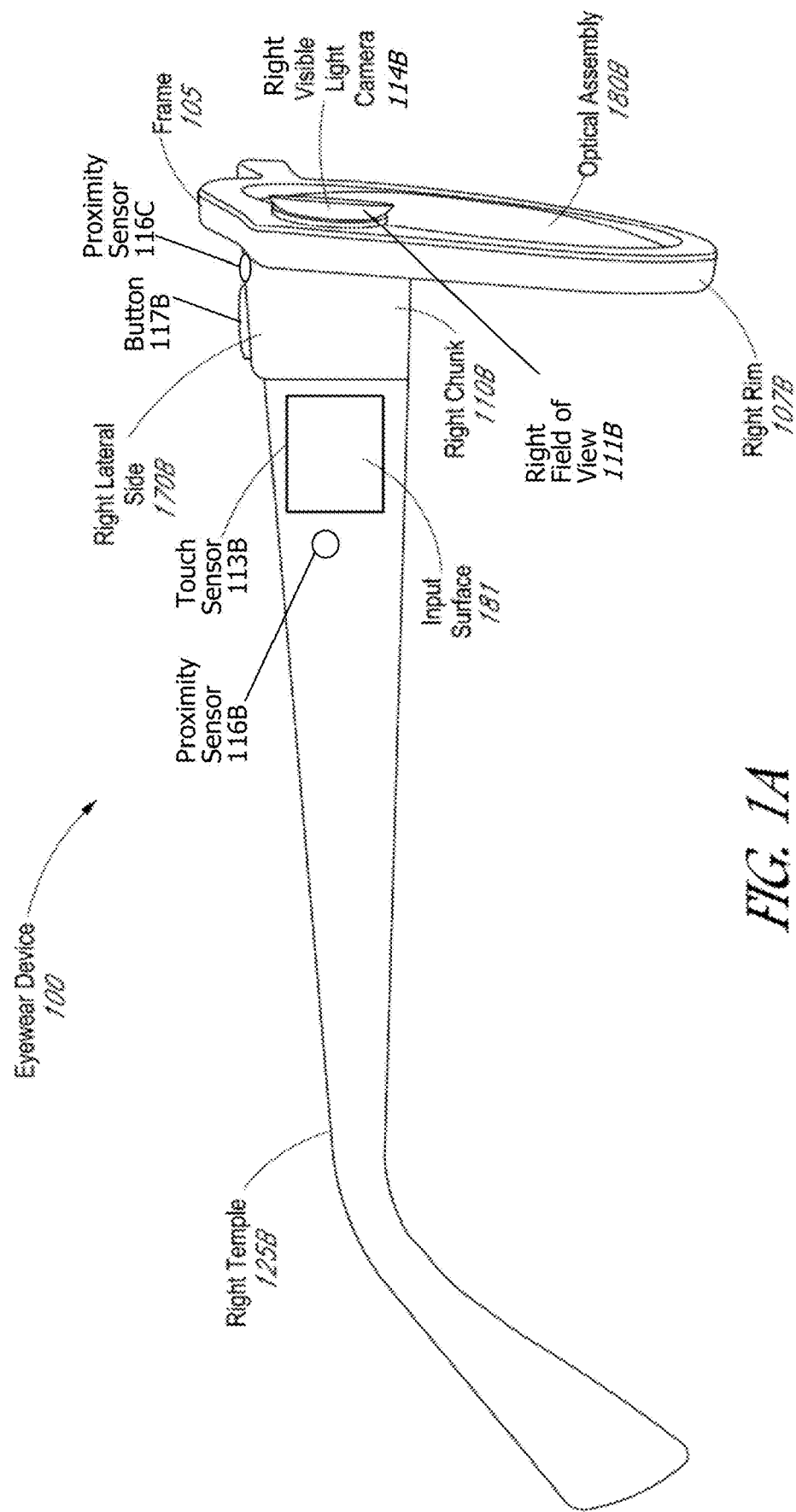
FIGS. 1A, 1B and 1C are right side views of hardware configurations of an eyewear device, which includes a proximity sensor, utilized in a proximity fade-in system for fading-in or out an image presented on an image display as the wearer's finger or hand gets closer to a user input device (e.g., touch sensor or button) on the eyewear device 100.

In the following detailed description, numerous specific details are set forth by way of examples in order to provide a thorough understanding of the relevant teachings. However, it should be apparent to those skilled in the art that the present teachings may be practiced without such details. In other instances, description of well-known methods, procedures, components, and circuitry are set forth at a relatively high-level, without detail, in order to avoid unnecessarily obscuring aspects of the present teachings.

The available area for placement of a user input device, such as various control buttons or touch sensors, on an eyewear device, e.g., to operate a camera, and manipulate graphical user interface elements on the image display of the eyewear device is limited. Size limitations and the form factor of the wearable device, such as the eyewear device, can make user input devices difficult to incorporate into the eyewear device. Even if the user input device is incorporated, the user (e.g., wearer) of the wearable device, may find it difficult to locate the user input device.

In wearable devices, consuming excessive power from batteries is troublesome. The image display depletes battery power considerably, particular when driven at high brightness level settings.

Accordingly, a need exists to help simplify user interactions with the user input device of wearable devices, for example, by helping the user locate the user input device of the eyewear device. It would also be beneficial to conserve battery power of the wearable device, for example, when the user is not interacting with the presented image on the image display.

As used herein, the term "fade-in" means a computer-generated effect applied to an image or sequence of images that manipulates a brightness level parameter of the image to change the visual perception of radiating or reflecting light. Brightness is a perception elicited by light output or luminance of the image and can be measured in luminous or other standard photometry quantities, such as luminous energy, luminous intensity, illuminance, or other SI photometry quantity. Fading-in is multi-directional and includes both switching the brightness of the presented image or user interface to a higher brightness level (brighter state) and lower brightness level (darker state) in response to detected finger distance proximity changes.

The term "coupled" or "connected" as used herein refers to any logical, optical, physical or electrical connection, link or the like by which electrical or magnetic signals produced or supplied by one system element are imparted to another coupled or connected element. Unless described otherwise, coupled or connected elements or devices are not necessarily directly connected to one another and may be separated by intermediate components, elements or communication media that may modify, manipulate or carry the electrical signals. The term "on" means directly supported by an element or indirectly supported by the element through another element integrated into or supported by the element.

The orientations of the eyewear device, associated components and any complete devices incorporating a proximity sensor such as shown in any of the drawings, are given by way of example only, for illustration and discussion purposes. In operation for proximity fade-in and user interaction, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom, side, horizontal, vertical, and diagonal are used by way of example only, and are not limiting as to direction or orientation of any proximity sensor or component of the proximity sensor constructed as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

Figure 1B:
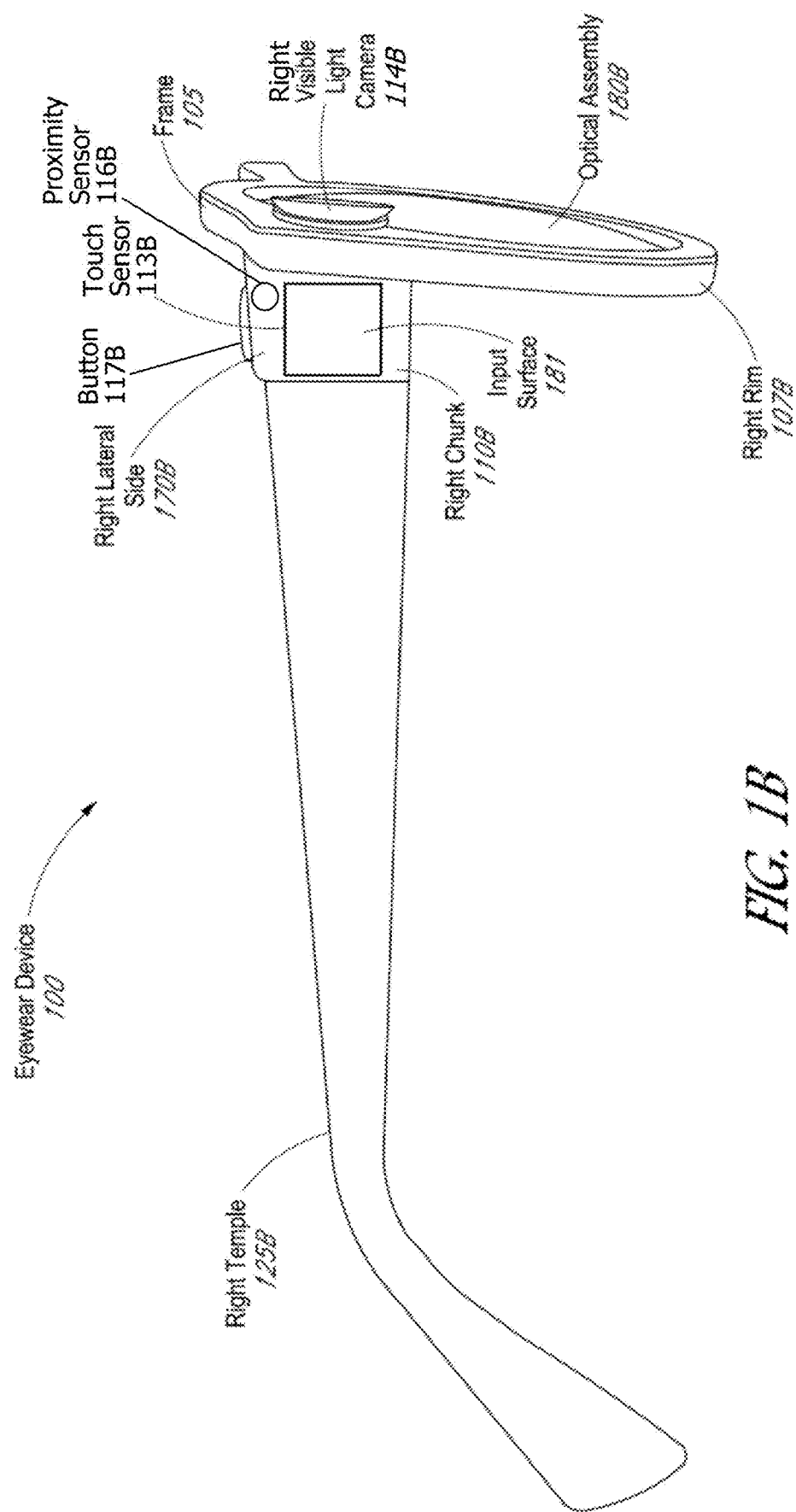
Figure 1C:
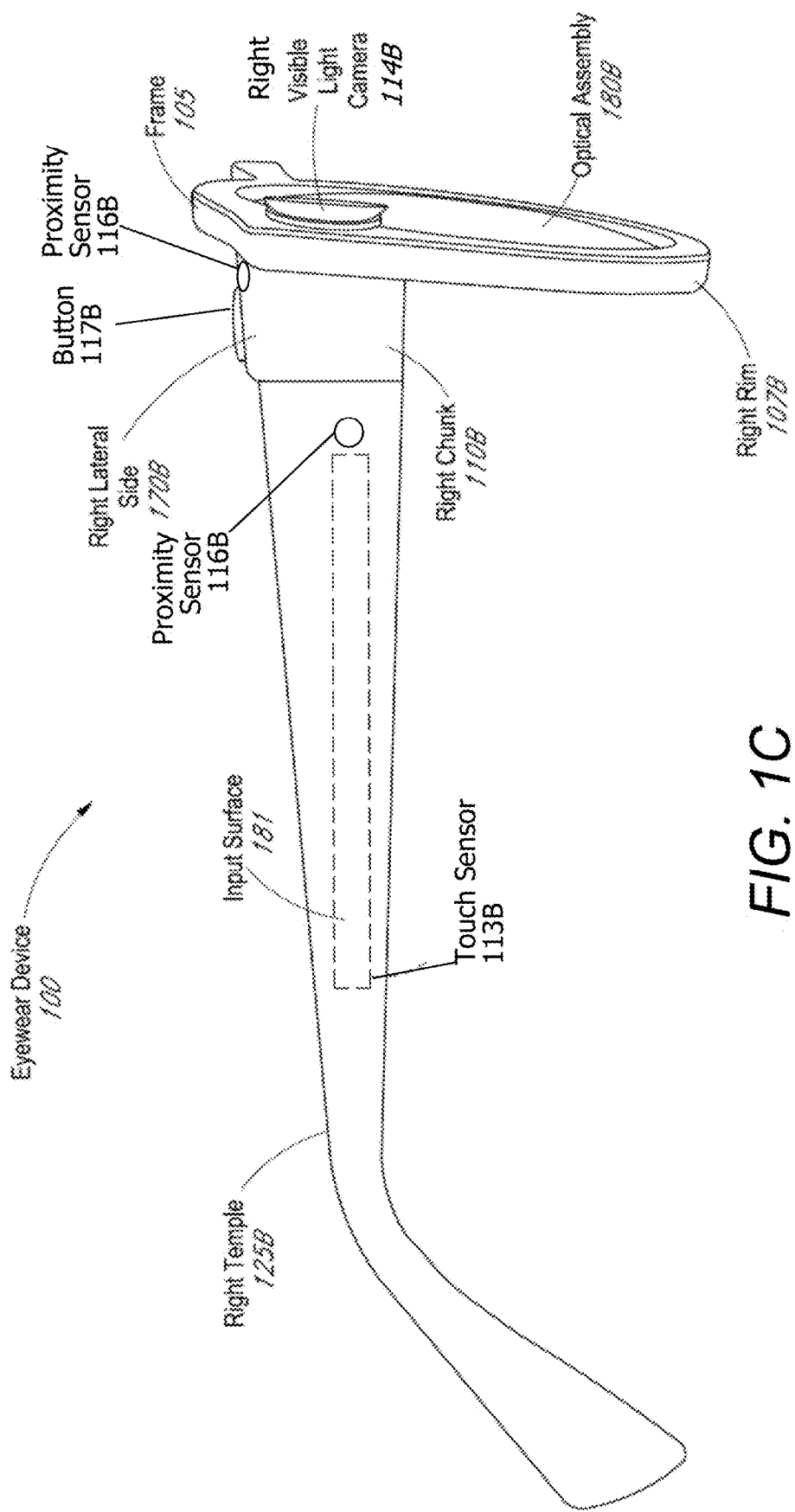

FIGS. 1A-C are right side views of example hardware configurations of an eyewear device 100, which includes a proximity sensor 116B, utilized in a proximity fade-in system for fading-in an image (e.g., including a graphical user interface). The image is presented on an image display mounted in front of the wearer's eyes and is faded in or out as the wearer's finger gets closer to a user input device. As shown, the user input device can include a touch sensor 113B or button 117B of the eyewear device 100.

FIG. 1A shows the proximity sensor 116B and the touch sensor 113B located on the right temple 125B. The touch sensor 113B includes an input surface 181 to track at least one finger contact inputted from a user, which can be formed of plastic, acetate, or another insulating material that forms a substrate of the frame 105, the temples 125A-B, or the lateral sides 170A-B. Moreover, in FIG. 1A another proximity sensor 116C and the button 117B are located on an upper portion of a right chunk 110B, which is a section of the eyewear positioned between the frame 105 and the temple 125B that may support user interface sensors and/or contain electronic components. FIG. 1B shows the proximity sensor 116B and the touch sensor 113B are located on the side of the right chunk 110B. FIG. 1C again shows the proximity sensor 116B and the touch sensor 113B located on the right temple 125, but the touch sensor 113B has an elongated shaped input surface 181.

As further described below, a combined hardware and software implementation guides the user's finger to the correct spot on the eyewear device 100 for the touch sensor 113B by fading the user interface presented on the image display 180A-B in and out based on how close the user's finger is to the touch interface point of the touch sensor 113B. The fade-in based user interface of the image display 180A-B works by utilizing the proximity sensor 116B to determine if the user's finger is nearby the touch sensor 113B. If proximity sensor 116B detects the user's finger, the proximity sensor 116B determines the user's finger distance range from the touchpoint of the touch sensor 113B. As the user's finger gets closer, the user interface presented on the image display 180A-B fades in, culminating in the brightest user interface when the user's finger is at the touch point, and as the user's finger gets further away, the user interface fades out.

If the user gets close enough or touches the touch point of the touch sensor 113B, then the user interface brightness will lock for some amount of time so that the user can interact with the interface, now that he or she has spatially located the touch sensor 113B. After a period of non-activity detected either in the presented user interface or by the proximity sensor 116B, the user interface will fade out completely if no finger is detected nearby the touch sensor 113B, otherwise the presented user interface will fade to the brightness correlating to the finger distance.

Eyewear device 100 may include the proximity sensor 116B and the touch sensor 113B on the frame 105, the temple 125A-B, or the chunk 110A-B. Proximity sensor 116B is an analog to digital device to track finger distance without any physical contact. The proximity sensor 116B can include a variety of scanners or sensor arrays including passive capacitance, optical, ultrasonic, thermal, piezoresistive, radio frequency (RF) for active capacitance measurement, micro-electrical mechanical systems (MEMS), or a combination thereof. Proximity sensor 116B can include an individual sensor or a sensor array (e.g., capacitive array, piezoelectric transducer, ultrasonic transducers, etc.) which may form a two-dimensional rectangular coordinate system. Photoelectric proximity sensors may include an individual sensor or a sensor array in the form of an image sensor array for measurement of reflected light and ultrasonic proximity sensors may include an individual sensor or a sensor array in the form of an ultrasonic transducer array for measurement of ultrasonic waves to track finger distance.

A capacitive type of proximity sensor 116B is a non-contact device that can detect the presence or absence of virtually any object regardless of material. The capacitive type of proximity sensor 116B utilizes the electrical property of capacitance and the change of capacitance based on a change in the electrical field around the active face of the capacitive proximity sensor 116B.

Although not shown in FIGS. 1A-D, the eyewear device 100 also includes a proximity sensing circuit integrated into or connected to the proximity sensor 116B. The proximity sensing circuit is configured to track finger distance of a finger of a wearer of the eyewear device 100 to the input surface 181. The fade-in system, which includes the eyewear device 100, has a processor coupled to the eyewear device 100 and connected to the proximity sensing circuit; and a memory accessible to the processor. The processor and memory may be, for example, in the eyewear device 100 itself or another part of the system.

The touch sensor 113B includes an input surface 181, which is a touch surface to receive input of a finger skin surface from a finger contact by a finger of a user. Gestures inputted on the touch sensor 113B can be used to manipulate and interact with the displayed content on the image display and control the applications.

While touch screens exist for mobile devices, such as tablets and smartphones, utilization of a touch screen in the lens of an eyewear device can interfere with the line of sight of the user of the eyewear device 100 and hinder the user's view. For example, finger touches can smudge the optical assembly 180-B (e.g., optical layers, image display, and lens) and cloud or obstruct the user's vision. To avoid creating blurriness and poor clarity when the user's eyes look through the transparent portion of the optical assembly 180A-B, the touch sensor 113B is located on the right temple 125B (FIGS. 1A and 1C) or the right chunk 110B (FIG. 1B).

Touch sensor 113B can include a sensor array, such as a capacitive or resistive array, for example, horizontal strips or vertical and horizontal grids to provide the user with variable slide functionality, or combinations thereof. In one example, the capacitive array or the resistive array of the touch sensor 113B is a grid that forms a two-dimensional rectangular coordinate system to track X and Y axes location coordinates. In another example, the capacitive array or the resistive array of the touch sensor 113B is linear and forms a one-dimensional linear coordinate system to track an X axis location coordinate. Alternatively, or additionally, the touch sensor 113B may be an optical type sensor that includes an image sensor that captures images and is coupled to an image processor for digital processing along with a timestamp in which the image is captured. The timestamp can be added by a coupled touch sensing circuit which controls operation of the touch sensor 113B and takes measurements from the touch sensor 113B. The touch sensing circuit uses algorithms to detect patterns of the finger contact on the input surface 181 from the digitized images that are generated by the image processor. Light and dark areas of the captured images are then analyzed to track the finger contact and detect a touch event, which can be further based on a time that each image is captured.

Touch sensor 113B can enable several functions, for example, touching anywhere on the touch sensor 113B may highlight an item on the screen of the image display of the optical assembly 180A-B. Double tapping on the touch sensor 113B may select an item. Sliding (e.g., or swiping) a finger from front to back may slide or scroll in one direction, for example, to move to a previous video, image, page, or slide. Sliding the finger from back to front may slide or scroll in the opposite direction, for example, to move to a previous video, image, page, or slide. Pinching with two fingers may provide a zoom-in function to zoom in on content of a displayed image. Unpinching with two fingers provides a zoom-out function to zoom out of content of a displayed image. The touch sensor 113B can be provided on both the left and right temples 125A-B to increase available functionality or on other components of the eyewear device 100, and in some examples, two, three, four, or more touch sensors 113B can be incorporated into the eyewear device 100 in different locations.

The type of touch sensor 113B depends on the intended application. For example, a capacitive type touch sensor 113B has limited functionality when the user wears gloves. Additionally, rain can trip false registers on the capacitive type touch sensor 113B. A resistive type touch sensor 113B on the other hand, requires more applied force, which may not be optimal to the user wearing the eyewear device 100 on their head. Both capacitive and resistive type technologies can be leveraged by having multiple touch sensors 113B in the eyewear device 100 given their limitations.

Figure 1D:
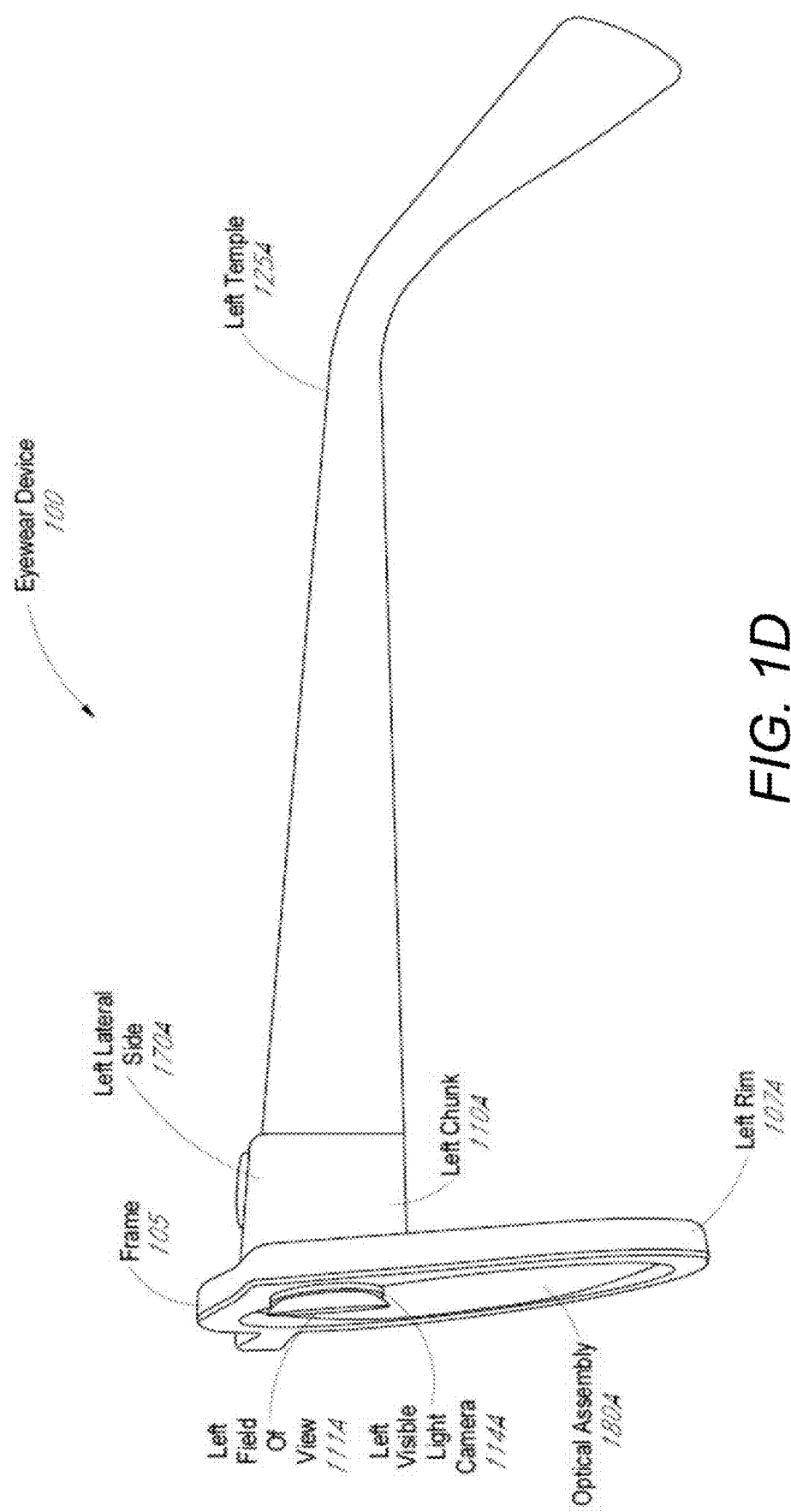
FIG. 1D is a left side view of an example hardware configuration of an eyewear device of FIGS. 1A-C, which shows a left visible light camera of a depth-capturing camera.

Eyewear device 100, includes a right optical assembly 180B with an image display to present images (e.g., based on a left raw image, a processed left image, a right raw image, or a processed right image). As shown in FIGS. 1A-C, the eyewear device 100 includes the right visible light camera 114B. Eyewear device 100 can include multiple visible light cameras 114A-B that form a passive type of depth-capturing camera, such as a stereo camera, of which the right visible light camera 114B is located on a right chunk 110B. As shown in FIG. 1D, the eyewear device 100 can also include a left visible light camera 114A on a left chunk 110A. Alternatively, in the example of FIG. 1G, the depth-capturing camera can be an active type of depth-capturing camera that includes a single visible light camera 114B and a depth sensor (e.g., an infrared camera and an infrared emitter, element 213).

Left and right visible light cameras 114A-B are sensitive to the visible light range wavelength. Each of the visible light cameras 114A-B have a different frontward facing field of view which are overlapping to allow three-dimensional depth images to be generated, for example, right visible light camera 114B has the depicted right field of view 111B. Generally, a "field of view" is the part of the scene that is visible through the camera at a particular position and orientation in space. Objects or object features outside the field of view 111A-B when the image is captured by the visible light camera are not recorded in a raw image (e.g., photograph or picture). The field of view describes an angle range or extent which the image sensor of the visible light camera 114A-B picks up electromagnetic radiation of a given scene in a captured image of the given scene. Field of view can be expressed as the angular size of the view cone, i.e., an angle of view. The angle of view can be measured horizontally, vertically, or diagonally.

In an example, visible light cameras 114A-B have a field of view with an angle of view between 15° to 30°, for example 24°, and have a resolution of 480×480 pixels. The "angle of coverage" describes the angle range that a lens of visible light cameras 114A-B or infrared camera can effectively image. Typically, the image circle produced by a camera lens is large enough to cover the film or sensor completely, possibly including some vignetting toward the edge. If the angle of coverage of the camera lens does not fill the sensor, the image circle will be visible, typically with strong vignetting toward the edge, and the effective angle of view will be limited to the angle of coverage.

Examples of such visible lights camera 114A-B include a high-resolution complementary metal-oxide-semiconductor (CMOS) image sensor and a video graphic array (VGA) camera, such as 640p (e.g., 640×480 pixels for a total of 0.3 megapixels), 720p, or 1080p. As used herein, the term "overlapping" when referring to field of view means the matrix of pixels in the generated raw image(s) or infrared image of a scene overlap by 30% or more. As used herein, the term "substantially overlapping" when referring to field of view means the matrix of pixels in the generated raw image(s) or infrared image of a scene overlap by 50% or more.

Image sensor data from the visible light cameras 114A-B are captured along with geolocation data, digitized by an image processor, and stored in a memory. The captured left and right raw images captured by respective visible light cameras 114A-B are in the two-dimensional space domain and comprise a matrix of pixels on a two-dimensional coordinate system that includes an X axis for horizontal position and a Y axis for vertical position. Each pixel includes a color attribute (e.g., a red pixel light value, a green pixel light value, and/or a blue pixel light value); and a position attribute (e.g., an X location coordinate and a Y location coordinate).

To provide stereoscopic vision, visible light cameras 114A-B may be coupled to an image processor (element 912 of FIG. 9) for digital processing along with a timestamp in which the image of the scene is captured. Image processor 912 includes circuitry to receive signals from the visible light cameras 114A-B and process those signals from the visible light camera 114 into a format suitable for storage in the memory. The timestamp can be added by the image processor 912 or other processor 932, which controls operation of the visible light cameras 114A-B. Visible light cameras 114A-B allow the depth-capturing camera to simulate human binocular vision. Depth-capturing camera provides the ability to reproduce three-dimensional images based on two captured images from the visible light cameras 114A-B having the same timestamp. Such three-dimensional images allow for an immersive life-like experience, e.g., for virtual reality or video gaming.

For stereoscopic vision, a pair of raw red, green, and blue (RGB) images are captured of a scene at a given moment in time—one image for each of the left and right visible light cameras 114A-B. When the pair of captured raw images from the frontward facing left and right field of views 111A-B of the left and right visible light cameras 114A-B are processed (e.g., by the image processor 912 of FIG. 9), depth images are generated, and the generated depth images can be perceived by a user on the optical assembly 180A-B or other image display(s) (e.g., of a mobile device). The generated depth images are in the three-dimensional space domain and can comprise a mesh of vertices on a three-dimensional location coordinate system that includes an X axis for horizontal position (e.g., length), a Y axis for vertical position (e.g., height), and a Z axis for depth (e.g., distance). Each vertex includes a position attribute (e.g., a red pixel light value, a green pixel light value, and/or a blue pixel light value); a position attribute (e.g., an X location coordinate, a Y location coordinate, and a Z location coordinate); a texture attribute, and/or a reflectance attribute. The texture attribute quantifies the perceived texture of the depth image, such as the spatial arrangement of color or intensities in a region of vertices of the depth image.

Figure 1E:
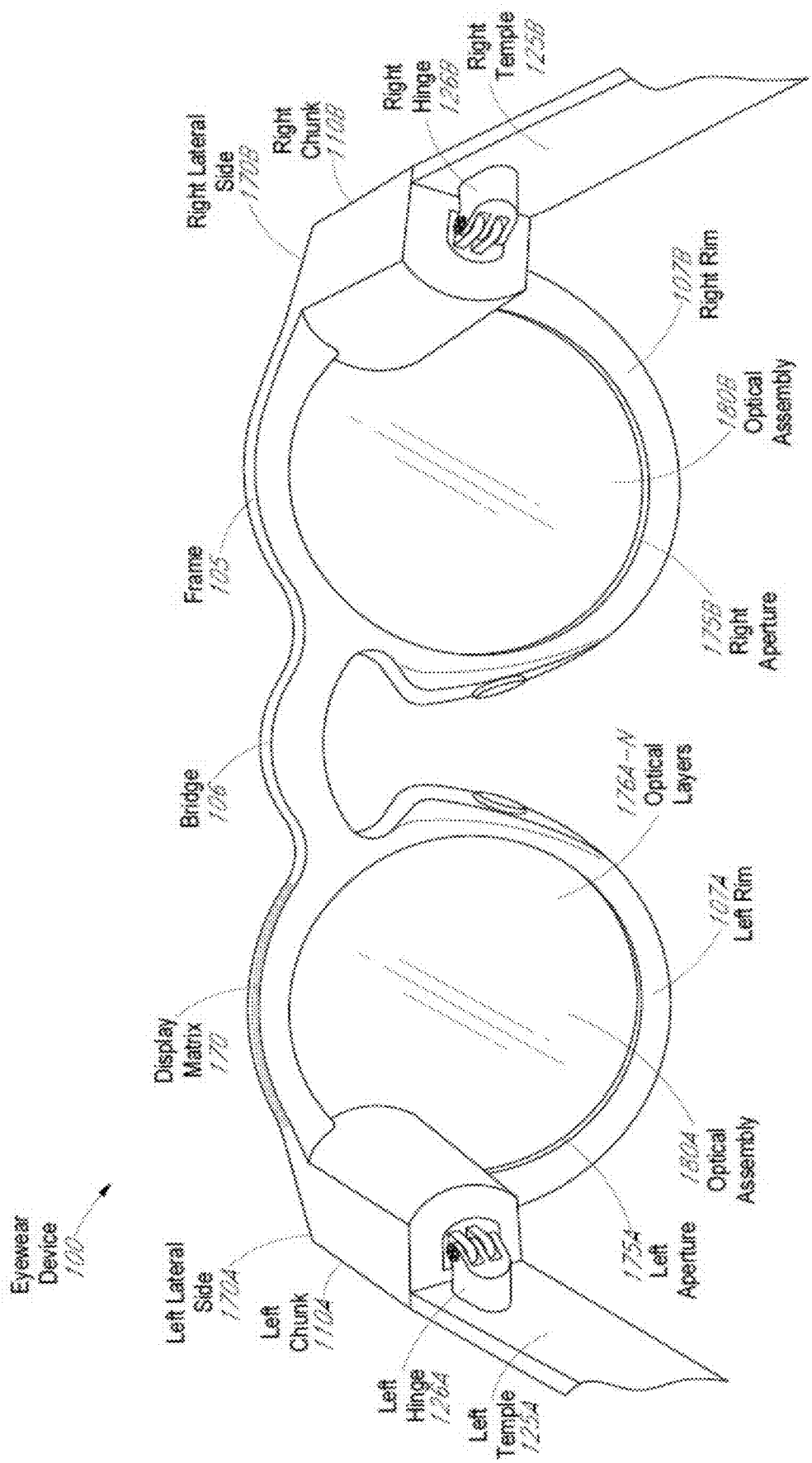
FIGS. 1E and 1F are rear views of example hardware configurations of the eyewear device, including two different types of image displays.
Figure 1F:
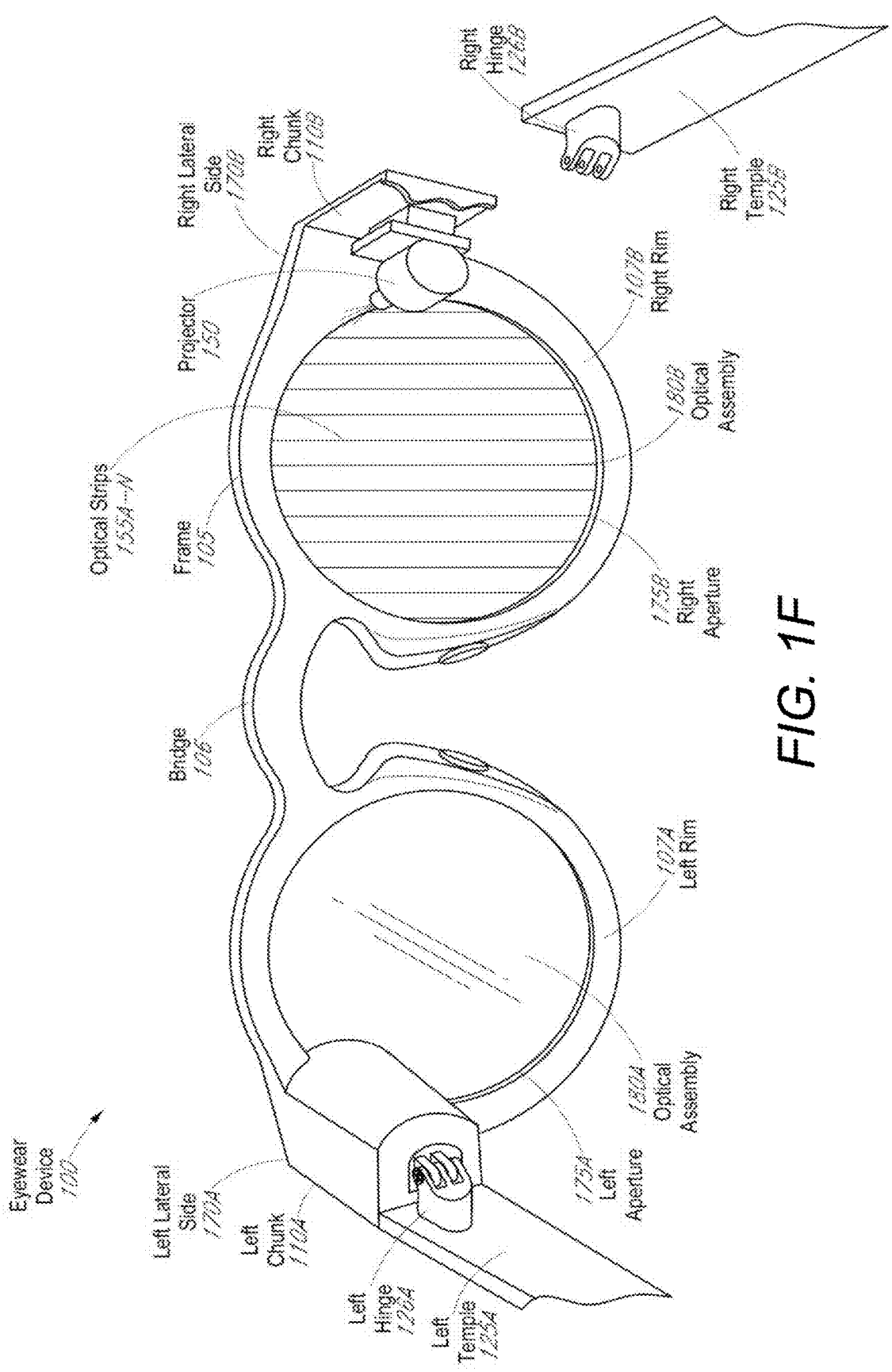

FIGS. 1E-F are rear views of example hardware configurations of the eyewear device 100, including two different types of image displays. Eyewear device 100 is in a form configured for wearing by a user, which are eyeglasses in the example. The eyewear device 100 can take other forms and may incorporate other types of frameworks, for example, a headgear, a headset, or a helmet.

In the eyeglasses example, eyewear device 100 includes a frame 105 including a left rim 107A connected to a right rim 107B via a bridge 106 adapted for a nose of the user. The left and right rims 107A-B include respective apertures 175A-B which hold a respective optical element 180A-B, such as a lens and a display device. As used herein, the term lens is meant to cover transparent or translucent pieces of glass or plastic having curved and/or flat surfaces that cause light to converge/diverge or that cause little or no convergence or divergence.

Although shown as having two optical elements 180A-B, the eyewear device 100 can include other arrangements, such as a single optical element or may not include any optical element 180A-B depending on the application or intended user of the eyewear device 100. As further shown, eyewear device 100 includes a left chunk 110A adjacent the left lateral side 170A of the frame 105 and a right chunk 110B adjacent the right lateral side 170B of the frame 105. The chunks 110A-B may be integrated into the frame 105 on the respective lateral sides 170A-B (as illustrated) or implemented as separate components attached to the frame 105 on the respective sides 170A-B. Alternatively, the chunks 110A-B may be integrated into temples (not shown) attached to the frame 105.

In one example, the image display of optical assembly 180A-B includes an integrated image display. As shown in FIG. 1E, the optical assembly 180A-B includes a suitable display matrix 170 of any suitable type, such as a liquid crystal display (LCD), an organic light-emitting diode (OLED) display, or any other such display. The optical assembly 180A-B also includes an optical layer or layers 176, which can include lenses, optical coatings, prisms, mirrors, waveguides, optical strips, and other optical components in any combination. The optical layers 176A-N can include a prism having a suitable size and configuration and including a first surface for receiving light from display matrix and a second surface for emitting light to the eye of the user. The prism of the optical layers 176A-N extends over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism is sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the display matrix 170, and the light travels through the prism so that the image viewed from the second surface is larger in one or more dimensions than the image emitted from the display matrix 170.

In another example, the image display device of optical assembly 180A-B includes a projection image display as shown in FIG. 1F. The optical assembly 180A-B includes a laser projector 150, which is a three-color laser projector using a scanning mirror or galvanometer. During operation, an optical source such as a laser projector 150 is disposed in or on one of the temples 125A-B of the eyewear device 100. Optical assembly 180A-B includes one or more optical strips 155A-N spaced apart across the width of the lens of the optical assembly 180A-B or across a depth of the lens between the front surface and the rear surface of the lens.

As the photons projected by the laser projector 150 travel across the lens of the optical assembly 180A-B, the photons encounter the optical strips 155A-N. When a particular photon encounters a particular optical strip, the photon is either redirected towards the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A-B, the eyewear device 100 can include other arrangements, such as a single or three optical assemblies, or the optical assembly 180A-B may have arranged different arrangement depending on the application or intended user of the eyewear device 100.

As further shown in FIGS. 1E-F, eyewear device 100 includes a left chunk 110A adjacent the left lateral side 170A of the frame 105 and a right chunk 110B adjacent the right lateral side 170B of the frame 105. The chunks 110A-B may be integrated into the frame 105 on the respective lateral sides 170A-B (as illustrated) or implemented as separate components attached to the frame 105 on the respective sides 170A-B. Alternatively, the chunks 110A-B may be integrated into temples 125A-B attached to the frame 105. As used herein, the chunks 110A-B can include an enclosure that encloses a collection of processing units, camera, sensors, etc. (e.g., different for the right and left side) that are encompassed in an enclosure.

In one example, the image display includes a first (left) image display and a second (right) image display. Eyewear device 100 includes first and second apertures 175A-B which hold a respective first and second optical assembly 180A-B. The first optical assembly 180A includes the first image display (e.g., a display matrix 170A of FIG. 1E; or optical strips 155A-N' and a projector 150A of FIG. 1F. The second optical assembly 180B includes the second image display (e.g., a display matrix 170B of FIG. 1E; or optical strips 155A-N" and a projector 150B of FIG. 1F).

Figure 1G:
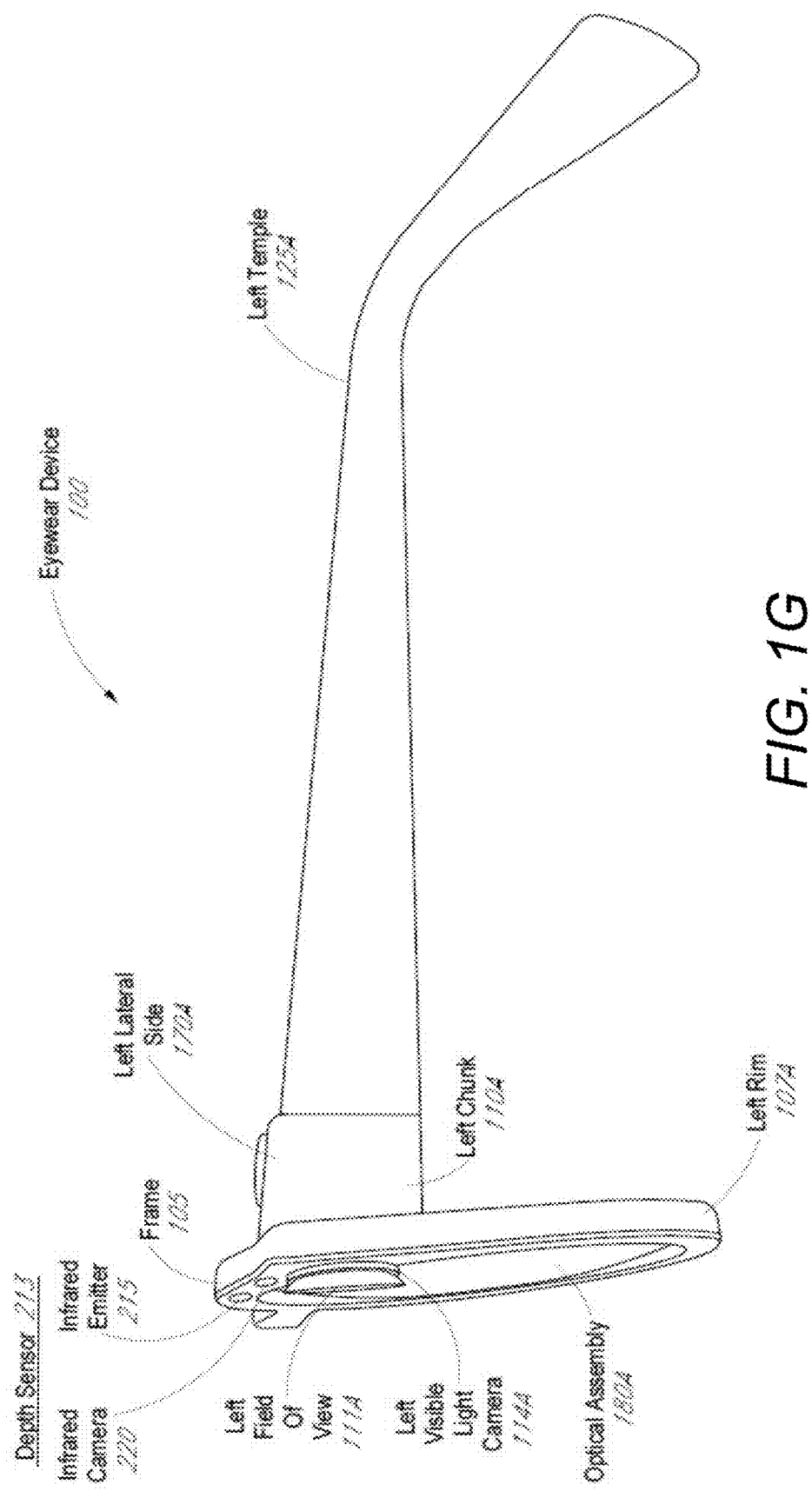
FIG. 1G is a left side view of another example hardware configuration of an eyewear device utilized in the proximity fade-in system, which shows the left visible light camera and a depth sensor of the depth-capturing camera to generate a depth image.

FIG. 1G is a left side view of another example hardware configuration of an eyewear device 100 utilized in the proximity fade-in system. As shown, the depth-capturing camera includes a left visible light camera 114A and a depth sensor 213 on a frame 105 to generate a depth image. Instead of utilizing at least two visible light cameras 114A-B to generate the depth image, here a single visible light camera 114A and the depth sensor 213 are utilized to generate depth images, such as the depth image. The infrared camera 220 of the depth sensor 213 has an outward facing field of view that substantially overlaps with the left visible light camera 114A for a line of sight of the eye of the user. As shown, the infrared emitter 215 and the infrared camera 220 are co-located on the upper portion of the left rim 107A with the left visible light camera 114A.

In the example of FIG. 1G, the depth sensor 213 of the eyewear device 100 includes an infrared emitter 215 and an infrared camera 220 which captures an infrared image. Visible light cameras 114A-B typically include a blue light filter to block infrared light detection. In an example, the infrared camera 220 is a visible light camera, such as a low resolution video graphic array (VGA) camera (e.g., 640×480 pixels for a total of 0.3 megapixels), with the blue filter removed. The infrared emitter 215 and the infrared camera 220 are co-located on the frame 105. For example, both are shown as connected to the upper portion of the left rim 107A. As described in further detail below, the frame 105 or one or more of the left and right chunks 110A-B include a circuit board that includes the infrared emitter 215 and the infrared camera 220. The infrared emitter 215 and the infrared camera 220 can be connected to the circuit board by soldering, for example.

Other arrangements of the infrared emitter 215 and infrared camera 220 can be implemented, including arrangements in which the infrared emitter 215 and infrared camera 220 are both on the right rim 107B, or in different locations on the frame 105, for example, the infrared emitter 215 is on the left rim 107A and the infrared camera 220 is on the right rim 107B. However, the at least one visible light camera 114A and the depth sensor 213 typically have substantially overlapping fields of view to generate three-dimensional depth images. In another example, the infrared emitter 215 is on the frame 105 and the infrared camera 220 is on one of the chunks 110A-B, or vice versa. The infrared emitter 215 can be connected essentially anywhere on the frame 105, left chunk 110A, or right chunk 110B to emit a pattern of infrared in the light of sight of the eye of the user. Similarly, the infrared camera 220 can be connected essentially anywhere on the frame 105, left chunk 110A, or right chunk 110B to capture at least one reflection variation in the emitted pattern of infrared light of a three-dimensional scene in the light of sight of the eye of the user.

The infrared emitter 215 and infrared camera 220 are arranged to face outwards to pick up an infrared image of a scene with objects or object features that the user wearing the eyewear device 100 observes. For example, the infrared emitter 215 and infrared camera 220 are positioned directly in front of the eye, in the upper part of the frame 105 or in the chunks 110A-B at either ends of the frame 105 with a forward facing field of view to capture images of the scene which the user is gazing at, for measurement of depth of objects and object features.

In one example, the infrared emitter 215 of the depth sensor 213 emits infrared light illumination in the forward-facing field of view of the scene, which can be near-infrared light or other short-wavelength beam of low-energy radiation. Alternatively, or additionally, the depth sensor 213 may include an emitter that emits other wavelengths of light besides infrared and the depth sensor 213 further includes a camera sensitive to that wavelength that receives and captures images with that wavelength. As noted above, the eyewear device 100 is coupled to a processor and a memory, for example in the eyewear device 100 itself or another part of the proximity fade-in system. Eyewear device 100 or the proximity fade-in system can subsequently process the captured infrared image during generation of three-dimensional depth images, such as the depth image.

Figure 2A:
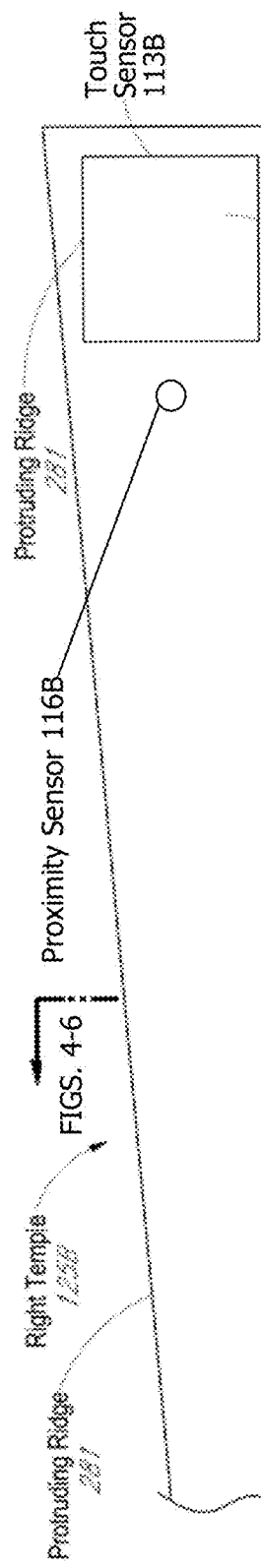
FIG. 2A shows a side view of a temple of the eyewear device of FIGS. 1A-B depicting a proximity sensor and a capacitive type touch sensor example.

FIG. 2A shows a side view of a temple of the eyewear device 100 of FIGS. 1A-D depicting a proximity sensor 116B and a capacitive type touch sensor 113B example with the square shaped input surface 181 of FIGS. 1A-B. As shown, the right temple 125B includes the proximity sensor 116B and the touch sensor 113B has an input surface 181. A protruding ridge 281 surrounds the input surface 181 of the touch sensor 113B to indicate to the user an outside boundary of the input surface 181 of the touch sensor 113B. The protruding ridge 281 orients the user by indicating to the user that their finger is on top of the touch sensor 113B and is in the correct position to manipulate the touch sensor 113B.

Figure 2B:
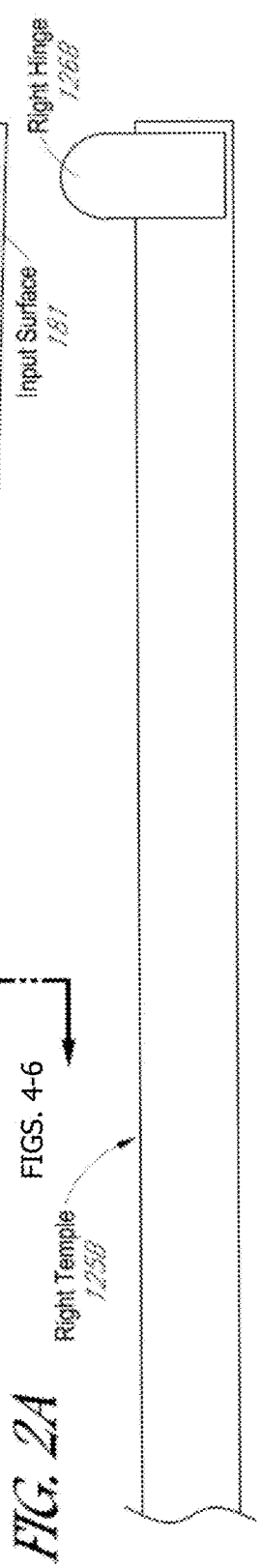
FIG. 2B illustrates an external side view of a portion of the temple of the eyewear device of FIGS. 1A-B and 2A.

FIG. 2B illustrates an external side view of a portion of the temple of the eyewear device 100 of FIGS. 1A-B and 2A. In the capacitive type proximity sensor 116B and the capacitive type touch sensor 113B example of FIGS. 2A-D and other touch sensor examples, plastic or acetate can form the right temple 125B. The right temple 125B is connected to the right chunk 110B via the right hinge 126B.

Figure 2C:
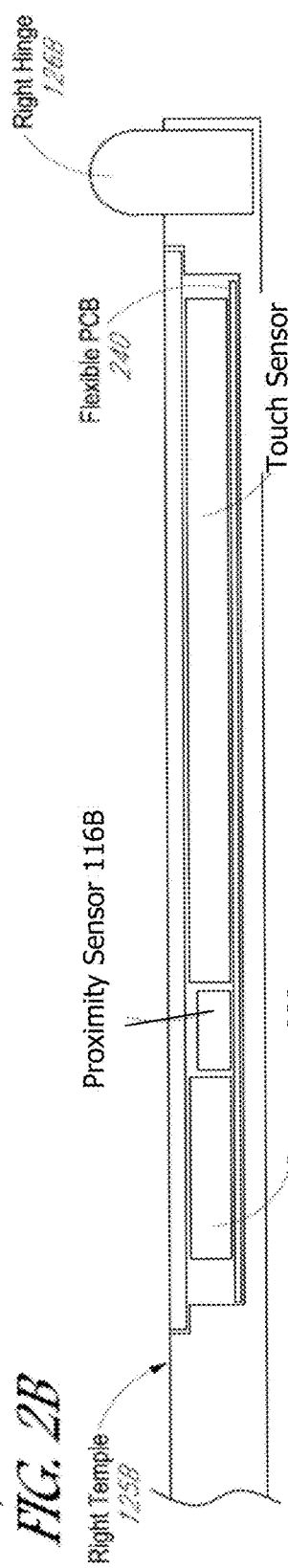
FIG. 2C illustrates an internal side view of the components of the portion of temple of the eyewear device of FIGS. 1A-B and 2B with a cross-sectional view of a circuit board with the proximity sensor, the touch sensor of FIGS. 1A-B, and a processor.

FIG. 2C illustrates an internal side view of the components of the portion of temple of the eyewear device 100 of FIGS. 1A-B and 2B with a cross-sectional view of a circuit board 240 with the proximity sensor 116B, the touch sensor 113B, and a processor 932. Although the circuit board 240 is a flexible printed circuit board (PCB), it should be understood that the circuit board 240 can be rigid in some examples. In some examples, the frame 105 or the chunk 110A-B can include the circuit board 240 that includes the proximity sensor 116B or the touch sensor 113B. In one example, a proximity sensing circuit 325 (e.g., see FIGS. 3E, 4A-B) of the proximity sensor 116B includes a dedicated microprocessor integrated circuit (IC) customized for processing sensor data from the conductive plate 320, along with volatile memory used by the microprocessor to operate. In some examples, the proximity sensing circuit 325 of the proximity sensor 116B and processor 932 may not be separate components, for example, functions and circuitry implemented in the proximity sensing circuit 325 of the proximity sensor 116B can be incorporated or integrated into the processor 932 itself.

The touch sensor 113B, including the capacitive array 214, is disposed on the flexible printed circuit board 240. The touch sensor 113B can include a capacitive array 214 that is positioned on the input surface 181 to receive at least one finger contact inputted from a user. A touch sensing circuit (not shown) is integrated into or connected to the touch sensor 113B and connected to the processor 932. The touch sensing circuit measures voltage to track the patterns of the finger skin surface on the input surface 181.

Figure 2D:
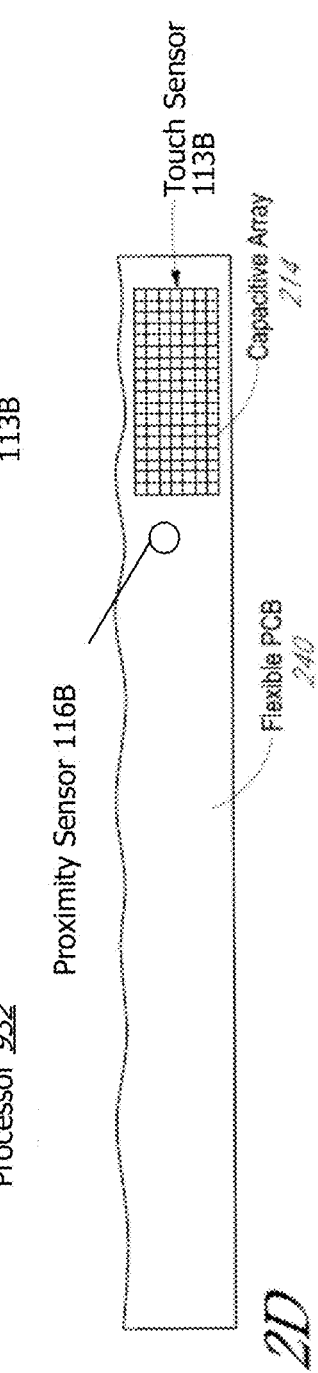
FIG. 2D depicts a capacitive array pattern formed on the circuit board of FIG. 2C to receive a finger skin surface inputted from the user.

FIG. 2D depicts a capacitive array pattern 214 formed on the circuit board of FIG. 2C to receive a finger skin surface inputted from the user. The pattern of the capacitive array 214 of the touch sensor 113B includes patterned conductive traces formed of at least one metal, indium tin oxide, or a combination thereof on the flexible printed circuit board 240. In the example, the conductive traces are rectangular shaped copper pads.

FIG. 3A shows an external side view of a temple of the eyewear device 100 of FIGS. 1A-D depicting another capacitive type touch sensor 113B with the elongated shaped input surface 181 of FIG. 1C and proximity sensor 116B. The right temple 125B or right chunk 110B may include the proximity sensor 116B and touch sensor 113B. FIG. 3B illustrates an external side view of a portion of the temple 125B of the eyewear device 100 of FIGS. 1A-D and 3A. Metal may form the right temple 125B and a plastic external layer can cover the metal layer.

FIG. 3C illustrates an internal side view of the components of the portion of temple of the eyewear device of FIGS. 1A-D and 3B with a cross-sectional view of a circuit board 240 with the proximity sensor 116B, touch sensor 113B, and the processor 932. Similar to FIG. 2C, the touch sensor 113B is disposed on the flexible printed circuit board 240. Various electrical interconnect(s) 294 are formed to convey electrical signals from the input surface 181 to the flexible printed circuit board 240. FIG. 3D depicts the capacitive array pattern 213 formed on the circuit board 240 of FIG. 3C to receive the finger skin surface inputted from the user.

FIG. 3E is an example proximity sensor 116B to track finger distance 315 of a finger of a wearer 310 or hand of a wearer 305 of the eyewear device 100. As shown, the proximity sensor 116B includes a conductive plate 320 and a proximity sensing circuit 325. Proximity sensing circuit 325 is coupled to a processor 932 that includes a brightness table 350 to fade-in a presented image 700A-C(See FIGS. 7A-7C).

In the example of FIG. 3E, a capacitive proximity sensor 416B (FIG. 4A) is shown as the proximity sensor 116B. Capacitive proximity sensor 416B includes: a conductive plate 320 and a proximity sensing circuit 325 connected to the processor 932. Proximity sensing circuit 325 is configured to measure voltage to track the finger distance 315 of the finger of the wearer 310 to the conductive plate 320. The proximity sensing circuit 325 of the capacitive proximity sensor 416B includes an oscillating circuit 330 electrically connected to the conductive plate 320 to produce oscillations with varying amplitudes corresponding to the measured voltage. The proximity sensing circuit 325 of the capacitive proximity sensor 416B further includes an output switching device 335 (e.g., frequency detector) to convert the oscillations into the measured voltage and convey the measured voltage to the processor 932. Execution of the proximity fade-in programming 945 (FIG. 9) by the processor 932 itself further configures the eyewear device 100 to convert the measured voltage into the tracked finger distance 315. For example, an analog to digital converter (ADC) 340 can convert the measured analog voltage into a digital value which is then conveyed to the processor 932 as the tracked finger distance 315. The capacitive proximity sensor 416B can be integrated into or connected to the capacitive touch sensor 113B, in other words, logically connected; however, in some examples the capacitive proximity sensor 416B and touch sensor 113B may be completely separate.

FIG. 3F is a brightness table 350 that includes finger distance ranges 355A-F and associated relative brightness levels 360A-F for each respective finger range 355A-F, in human readable format. As shown in FIG. 3F, the brightness table 350 includes: (i) a set of six finger distance ranges 355A-F to the input surface 181, and (ii) a set of six brightness levels 360A-F of the presented image 700A. Each respective finger distance range 355A-F is associated with a respective brightness level 360A-F. Finger distance ranges 355A-F are shown in centimeters (cm) and, depending on the application, may have different calibrated values to change sensitivity from the depicted six example ranges of: (a) 0-2 cm (minimum distance range), (b) 2.1-4 cm, (c) 4.1-6 cm, (d) 6.1-8 cm, (e) 8.1-10 cm, and (f) greater than 10.1 cm (maximum distance range). Brightness levels 360A-F are shown in normalized (compared or relative) values without accompanying SI photometry units, where a value of 5 is the maximum brightness state, a value of 0 is the maximum dark state, and values between 1 to 4 are intermediate brightness states. The first finger distance range 355A corresponds to a minimum distance range 355A that indicates direct contact of the finger of the wearer 310 with the input surface 181 of the touch sensor 113B to manipulate the graphical user interface. The first brightness level is a maximum brightness state 360A in which the brightness level setting 977 of the presented image 700A on the image display of optical assembly 180A-B is set to maximum light output. The sixth finger distance range 355F corresponds to a maximum distance range 355F that indicates non-activity such that the eyewear device 100 is not being worn or non-interaction with the graphical user interface by the wearer. The sixth brightness level is a maximum dark state 360F in which the brightness level setting 977 of the presented image 700A on the image display of optical assembly 180A-B is set to minimum light output or the image display of optical assembly 180A-B is powered off.

FIGS. 4A-B show operation and a circuit diagram of a proximity sensor 116B of FIGS. 1A-C, 2D and 3D depicting a capacitive proximity sensor 416B example. Capacitive proximity sensor 416B tracks a finger distance 315 of a finger of a wearer 310 of the eyewear device 100 to the input surface 181 of the user input device (e.g., touch sensor 113B or button 117B). As shown, the hand of wearer 305 of the eyewear device 100 is positioned near the conductive plate 320 of the capacitive proximity sensor 416B. Conductive plate 320 may include a single sensor electrode 415A or a capacitive array formed of multiple sensor electrodes 415A-N. Human skin is conductive and provides capacitive coupling in combination with an individual capacitive element of the conductive plate 320. When the finger skin surface 466 is closer to the capacitor plates, the sensor electrodes 415A-N have a higher capacitance whereas when the finger skin surface 466 is relatively further away, the sensor electrodes 415A-N have a lower capacitance.

The view of FIG. 4A is intended to give a cross-sectional view of three capacitors of the capacitive proximity sensor 416B of FIGS. 2A-D and 3A-D, and the coupled proximity sensing circuit 325. As shown, the capacitive proximity sensor 416B includes the conductive plate 320 formed by capacitors, including capacitors $C_A$, $C_B$, and $C_C$. The conductive plate 320 can include one individual sensor electrode 415A or multiple patterned conductive sensor electrodes 415A-N. It should be understood that although only five sensor electrodes are shown, the number can be 20, 100, 1000, etc. or essentially any number depending on the application. In one example, the capacitive array 214 includes 100 sensor electrodes, in other examples, the 100 sensor electrodes are arranged in a 10×10 grid. The sensor electrodes 415A-N are connected to the flexible printed circuit board 240 and disposed to next to the input surface 181. In some examples, the sensor electrodes 415A-N can be integrated with the touch sensor 113B, in which case the sensor electrodes 415A-N may be disposed below the input surface 181. At least one respective electrical interconnect connects the proximity sensing circuit 325 to the sensor electrodes 415A-N. The proximity sensing circuit 325 measures capacitance changes of each of the sensor electrodes 415A-N of the conductive plate 320 to track the finger distance 315 of finger skin surface 466 of the finger of wearer 310 to the input surface 181. In the example, the sensor electrodes 415A-N are rectangular patterned conductive traces formed of at least one of metal, indium tin oxide, or a combination thereof.

Since the capacitors $C_A$, $C_B$, and $C_C$ store electrical charge, connecting them to sensor electrodes 415A-N allows the capacitors to track the finger distance 315 of the finger skin surface 466. For example, capacitor $C_B$ tracks finger distance of the middle finger and capacitor $C_C$ tracks finger distance of the pointer finger of the hand of wearer 305. Pointer finger causes a higher capacitance than middle finger, generating a higher measured voltage signal. Hence, charges stored in the capacitor $C_C$ becomes higher when the pointer finger of finger skin surface 466 is placed over the conductive plates of capacitor $C_C$, while a larger air gap between the middle finger of finger skin surface 466 will leave the charge at the capacitor $C_B$ relatively lower. As shown in FIG. 4B, the proximity sensing circuit 325 can include an op-amp integrator circuit which can track these changes in capacitance of conductive plate 320, and the capacitance changes can then be recorded by an analog-to-digital converter (ADC) and stored in a memory along with timing data of when the capacitance change is sensed.

Figure 5:
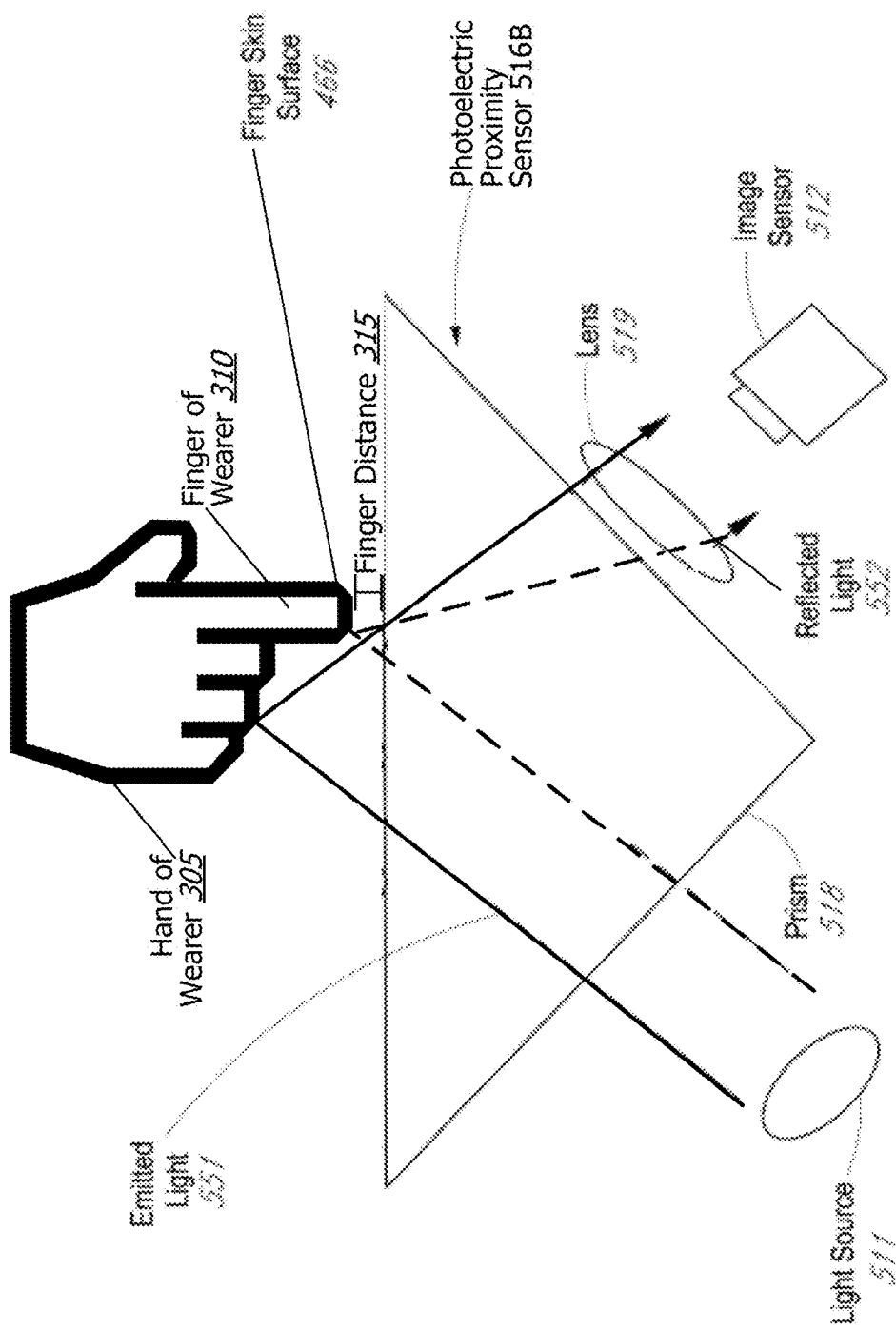
FIG. 5 shows operation of a proximity sensor of the eyewear device of FIGS. 1A-C depicting a photoelectric proximity sensor example.

FIG. 5 shows operation of a proximity sensor 116B of the eyewear device 100 of FIGS. 1A-C depicting a photoelectric proximity sensor 516B example. As shown, the photoelectric proximity sensor 516B includes an optical scanner that includes a light source 511 to emit light to illuminate the finger skin surface 466, shown as emitted light 551. The optical scanner further includes an image sensor 512 to capture an image of reflection variations of the emitted light 551, shown as reflected light 552, on the finger skin surface 466. The light source 511 and the image sensor 512 are connected to the frame 105, the temple 125A-B, or the chunk 110A-B. The photoelectric proximity sensor 116B may capture a digital image of the hand of wearer 305, including the finger of wearer 310, using visible light although other light wavelengths can be used, including infrared or near-infrared to track finger distance 315. Finger distance 315 is tracked (e.g., measured) based on the reflected light 552.

Execution of the proximity fade-in programming 945 by the processor 932 of the eyewear device 100 configures the eyewear device 100 to perform functions, including functions to emit, via the light source 511, the light 551 to illuminate the finger skin surface 466. In one example, the light source 511 can include an array of light emitting diodes (LEDs), for example, with a light-emitting phosphor layer, which illuminates the finger skin surface 466 with emitted light 551. Although a single emitted light wave 551 is shown in FIG. 5, many such emitted light waves are emitted by each of the point light source 511 elements (e.g., electrical to optical transducers) that collectively form an array of emitters of light sources 511, for example, at different time intervals.

Reflected light 552 from the finger skin surface 466 passes back through the phosphor layer to an array of solid state pixels of the image sensor 512. Although a single reflected light wave 552 is shown in FIG. 5, many such reflected light waves are received by each of the receiver elements (e.g., optical to electrical transducers) in the image sensor array of image sensor 512, for example, at different time intervals. Hence, execution of the proximity fade-in programming 945 by the processor 932 of the eyewear device 100 configures the eyewear device 100 to perform functions, including functions to capture, via the image sensor 512, the image of reflection variations of the emitted light 551 on the finger skin surface 466. Finger distance 315 is tracked based on the reflection variations of the emitted light 551. In an example, the image sensor 512 may include a CMOS or complimentary charge-coupled device (CCD)

based optical imager to capture an image of the finger skin surface 466. A CCD is an array of light-sensitive diodes called photo sites, which generate an electrical signal in response to light photons, sometimes referred as optical-to-electrical transducers. Each photo site records a pixel, a tiny dot representing the light that hit that spot. Such CCD devices are quite sensitive to low light levels can produce grayscale images. Collectively, the light and dark pixels form an image of the finger skin surface 466 which correlates to finger distance 315. An inverted image of the finger skin surface 466 may be generated where the darker areas represent more reflected light and the lighter areas represent less reflected light to track the finger distance 315. An analog-to-digital converter 340 in the proximity sensing circuit 325 can be utilized which processes the electrical signal to generate the digital representation of the hand of the wearer 305, which is correlated to the finger distance 305.

Figure 6:
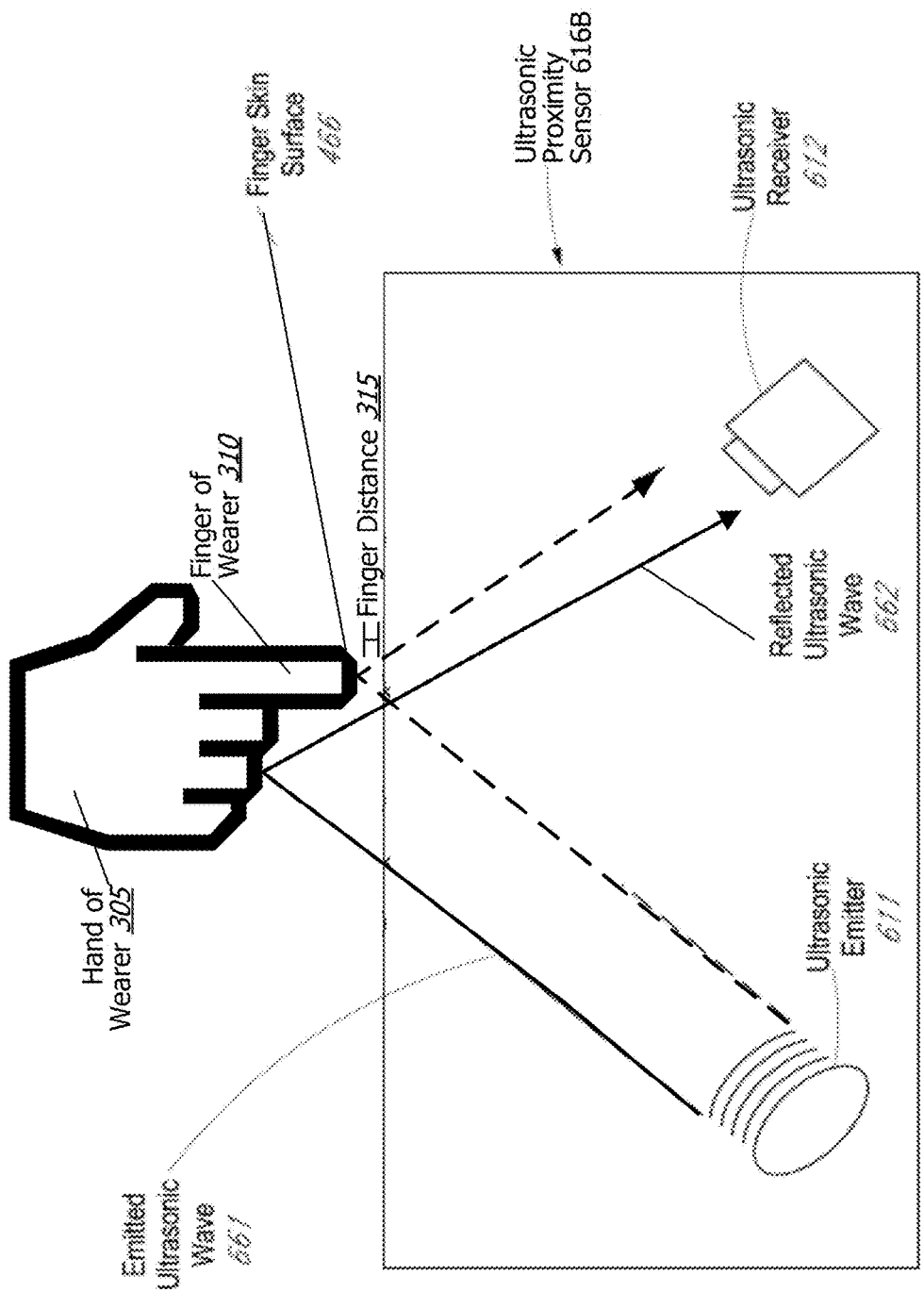
FIG. 6 shows operation of a proximity sensor of the eyewear device of FIGS. 1A-C depicting an ultrasonic proximity sensor example.

FIG. 6 shows operation of proximity sensor 116B of the eyewear device 100 of FIGS. 1A-C depicting an ultrasonic proximity sensor 616B example. As shown, the ultrasonic proximity sensor 616B includes an ultrasonic scanner, which has an ultrasonic emitter 611 to emit ultrasonic waves to strike the finger skin surface 466, shown as emitted ultrasonic wave 661 and an ultrasonic wave generator (not shown). Ultrasonic emitter 611 may include a piezoelectric transducer array, which is coupled to the ultrasonic wave generator, to transform an electrical signal into an ultrasonic wave to create the desired waveform pulses of the ultrasonic wave 661 at proper time intervals. The ultrasonic scanner further includes an ultrasonic receiver 612 to capture reflection variations of the emitted ultrasonic waves, shown as reflected ultrasonic wave 662, on the finger skin surface 466 to track finger distance 315 of the finger of the wearer 310 or the hand of wearer 305. Ultrasonic emitter 611 and ultrasonic receiver 612 are connected to the frame 105, the temple 125A-B, or the chunk 110A-B of the eyewear device 100. Finger distance 315 is tracked (e.g., measured) based on the reflected ultrasonic wave 662.

Ultrasonic receiver 612 may include an ultrasonic transducer array to detect the direction and strength of reflected ultrasonic waves 662 and transform those measurements into an electrical signal, which correlates to finger distance 315. The ultrasonic proximity sensor 116B captures a digital image of the hand of wearer 305 using ultrasonic wave pulses that is used to measure finger distance 315. In one example, an ultrasonic emitter 611 that is a piezoelectric micromachined ultrasonic transducer (PMUT) array that is bonded at wafer-level to an ultrasonic receiver 612 that includes CMOS signal processing electronics forms the ultrasonic proximity sensor 116B.

Execution of proximity fade-in programming 945 by the processor 932 of the eyewear device 100 configures the eyewear device 100 to perform functions, including functions to emit, via the ultrasonic emitter 611, the ultrasonic waves 661 to strike the finger skin surface 466. In one example, the ultrasonic emitter 611 transmits an ultrasonic wave 661 against the finger skin surface 466 that is placed over the input surface 181 and separated by finger distance 315. For example, a piezoelectric transducer array of ultrasonic emitter 611, which includes multiple point sources of the ultrasound energy, send the emitted ultrasonic waves 661 through an ultrasound transmitting media, including input surface 181. Some of the ultrasonic waves 662 are absorbed and other parts bounce back to the ultrasonic receiver 612, from which finger distance 315 is calculated.

Emitted ultrasonic waves 661 may be continuous or started and stopped to produce pulses. Although FIG. 6 shows a single emitted ultrasonic wave 661, each of the point source elements (e.g., piezoelectric transducer of ultrasound energy) in the ultrasonic emitter array of ultrasonic emitter 611 emit many such ultrasonic waves, for example, at different time intervals. When the hand of wearer 305 is encountered by the ultrasonic wave 661 pulses, a portion of the pulse reflects. For example, the finger of wearer 310 reflects a portion of ultrasonic pulses. The fraction of ultrasound reflected is a function of differences in impedance between the two materials comprising the interface (e.g., input surface 181 and finger of wearer 310). The fraction of ultrasound reflected can be calculated based on the acoustic impedances of the two materials, where acoustic impedance is a measure of a material's resistance to the propagation of ultrasound. From this calculation, the finger distance 315 is tracked.

Execution of the proximity fade-in programming 945 by the processor 932 of the eyewear device 100 further configures the eyewear device 100 to perform functions, including functions to capture, via the ultrasonic receiver 612, the reflection variations of the emitted ultrasonic waves 662 on the finger skin surface 466. Variations of the reflected ultrasonic wave 662 is unique to the finger distance 315 of the finger skin surface 466. Ultrasonic receiver 612 includes a sensor array that detects mechanical stress to calculate the intensity of the returning reflected ultrasonic wave 662 at different points on the finger skin surface 466. Multiple scans of the finger skin surface 466 can allow for depth data to be captured resulting in a highly detailed three-dimensional map reproduction of the finger skin surface 466, e.g., with X, Y, and Z location coordinates. The ultrasonic sensor can operate through metal, glass, and other solid surfaces which form the eyewear device 100.

The ultrasonic receiver 612 detects reflected ultrasonic wave 662. In particular, elapsed time during which the ultrasonic pulses travel from the ultrasound emitter 611 to the interface (e.g., finger of wearer 310) and back may be determined. Although FIG. 6 shows a single reflected ultrasonic wave 662, each of the receiver elements (e.g., ultrasonic transducers of ultrasound energy) in the ultrasonic receiver sensor array of ultrasonic receiver 612 receive many such ultrasonic waves, for example, at different time intervals. The elapsed time may be used to determine the distances traveled by the emitted ultrasonic wave 661 and its reflected ultrasonic wave 662 pulse. By knowing the travel distance, the finger distance 315 of the finger of wearer 310 or hand of wearer 305 may be determined based on reflected wave pulses associated with the finger skin surface 466. Reflected wave 662 pulses associated with the finger skin surface 466 are converted from analog to a digital value representing the signal strength and then combined in a gray-scale bitmap fingerprint image representative of the finger distance 315.

FIGS. 7A-C show operation of the proximity fade-in system that includes the eyewear device 100 with the proximity sensor 116B examples of FIGS. 1A-C, 4A-B, 5, and 6. Execution of proximity fade-in programming 945 in a memory 934 by the processor 932 of the eyewear device 100 configures the eyewear device 100 to perform functions, including the functions discussed in FIGS. 7A-C below. Although the functions described in FIGS. 7A-C are described as implemented by the processor 932 of the eyewear device 100, other components of the fade-in system 900 of FIG. 9 can implement any of the functions described herein, for example the mobile device 990, server system 998, or other host computer of the fade-in system 900.

In FIGS. 7A-C, three finger distances 315F, 315C, and 315A are tracked by the proximity sensor 116B. FIG. 7A illustrates tracking, via the proximity sensor 116B, a maximum finger distance 315F. When compared against the six finger distance ranges 355A-F of the brightness table 350 shown in FIG. 3F, the maximum dark state (brightness level 360F) is retrieved that is associated with the maximum distance (distance range 355F). As shown, the image display of the optical assembly 180A-B of the eyewear device 100 responsively presents the image 700A with the brightness level setting 977 set to the maximum dark state (brightness level 360F).

FIG. 7B illustrates tracking, via the proximity sensor 116B, a medium finger distance 315C. When compared against the six finger distance ranges 355A-F of the brightness table 350 shown in FIG. 3F, the medium bright state (brightness level 360C) is retrieved that is associated with the medium distance (distance range 355C). As shown, the image display of the optical assembly 180A-B of the eyewear device 100 responsively presents the image 700B with the brightness level setting 977 set to the medium bright state (brightness level 360C).

FIG. 7C illustrates tracking, via the proximity sensor 116B, a minimum finger distance 315A. When compared against the six finger distance ranges 355A-F of the brightness table 350 shown in FIG. 3F, the maximum bright state (brightness level 360A) is retrieved that is associated with the minimum distance (distance range 355A). As shown, the image display of the optical assembly 180A-B of the eyewear device 100 responsively presents the image 700C with the brightness level setting 977 set to the maximum bright state (brightness level 360A).

Figure 8A:
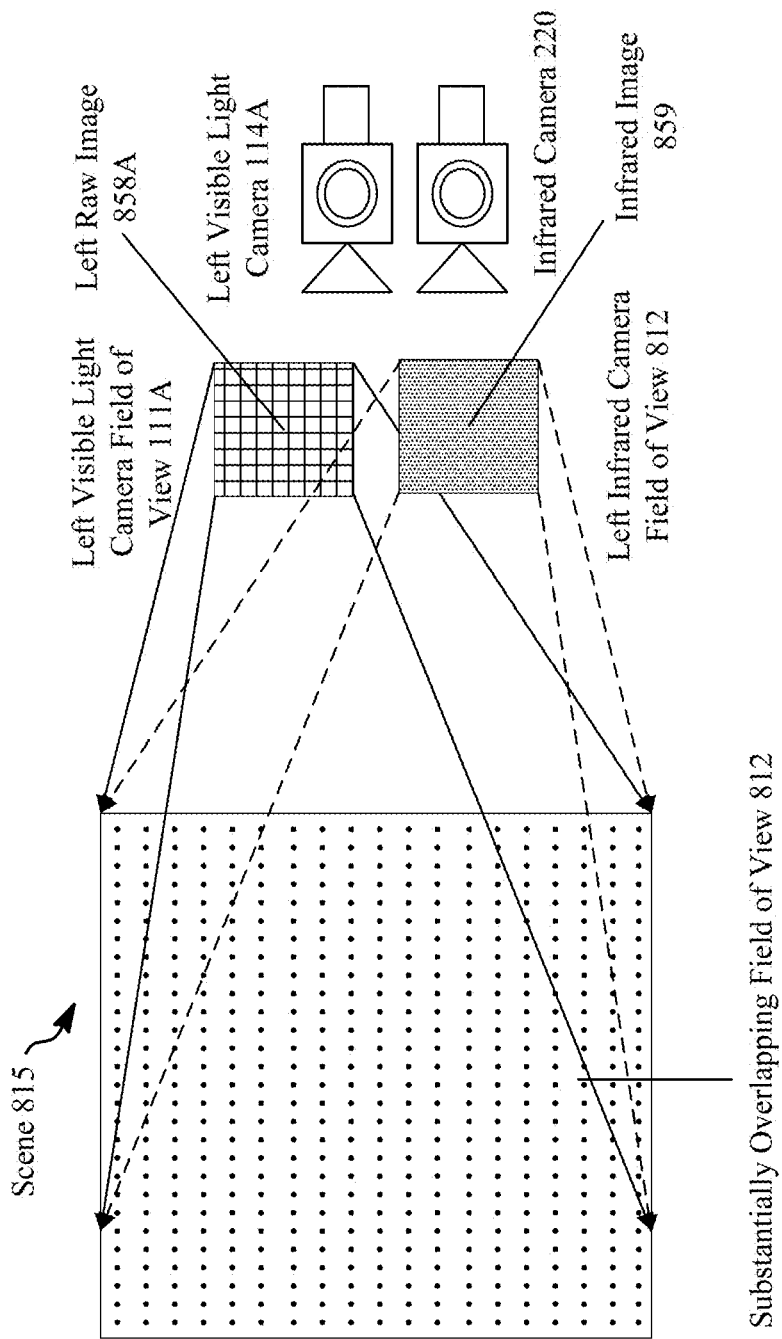
FIG. 8A depicts an example of infrared light captured by the infrared camera of the depth sensor as an infrared image and visible light captured by a visible light camera as a raw image to generate the initial depth image of a three-dimensional scene.

FIG. 8A depicts an example of infrared light captured by the infrared camera 220 of the depth sensor 213 with a left infrared camera field of view 812. Infrared camera 220 captures reflection variations in the emitted pattern of infrared light in the three-dimensional scene 815 as an infrared image 859. As further shown, visible light is captured by the left visible light camera 114A with a left visible light camera field of view 111A as a left raw image 858A. Based on the infrared image 859 and left raw image 858A, the three-dimensional depth image of the three-dimensional scene 815 is generated.

Figure 8B:
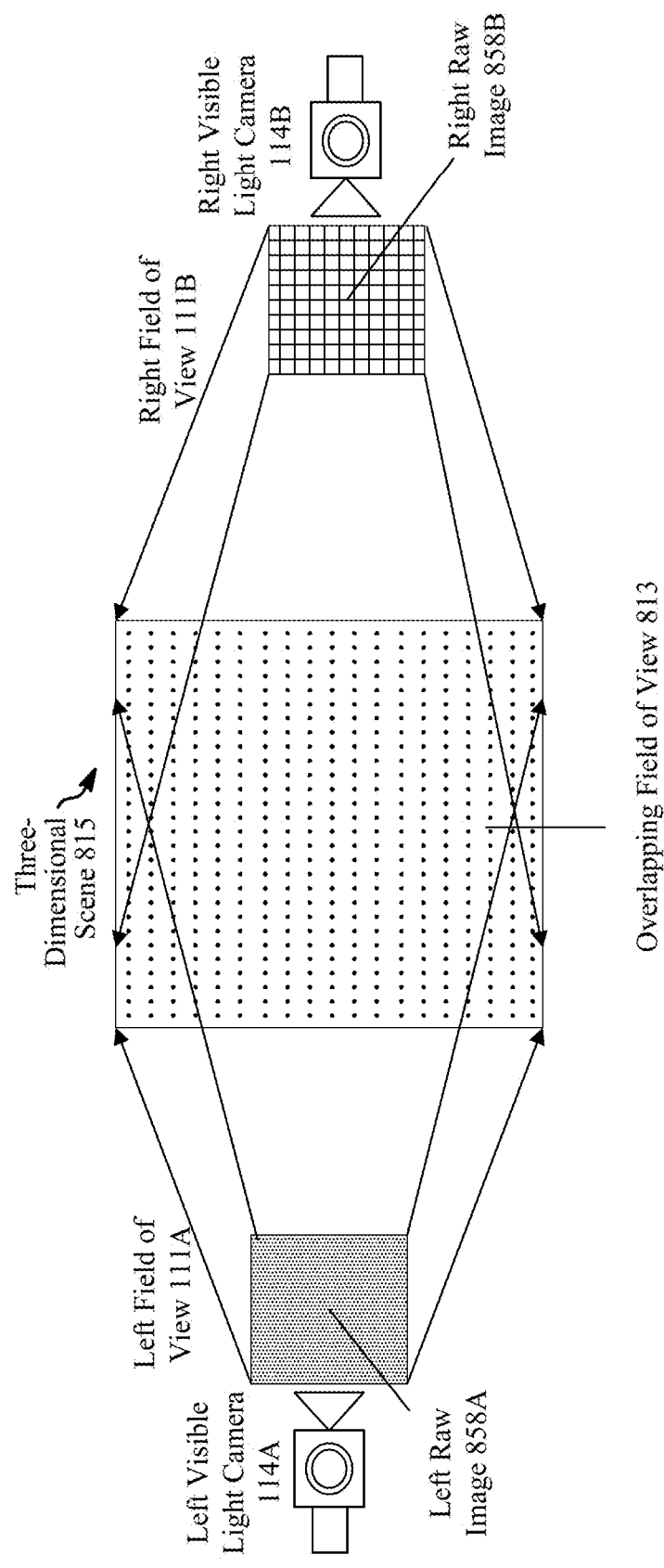
FIG. 8B depicts an example of visible light captured by the left visible light camera as a left raw image and visible light captured by the right visible light camera as a right raw image to generate the initial depth image of a three-dimensional scene.

FIG. 8B depicts an example of visible light captured by the left visible light camera 114A and visible light captured with a right visible light camera 114B. Visible light is captured by the left visible light camera 114A with a left visible light camera field of view 111A as a left raw image 858A. Visible light is captured by the right visible light camera 114B with a right visible light camera field of view 111B as a right raw image 858B. Based on the left raw image 858A and the right raw image 858B, the three-dimensional depth image of the three-dimensional scene 815 is generated.

Figure 9:
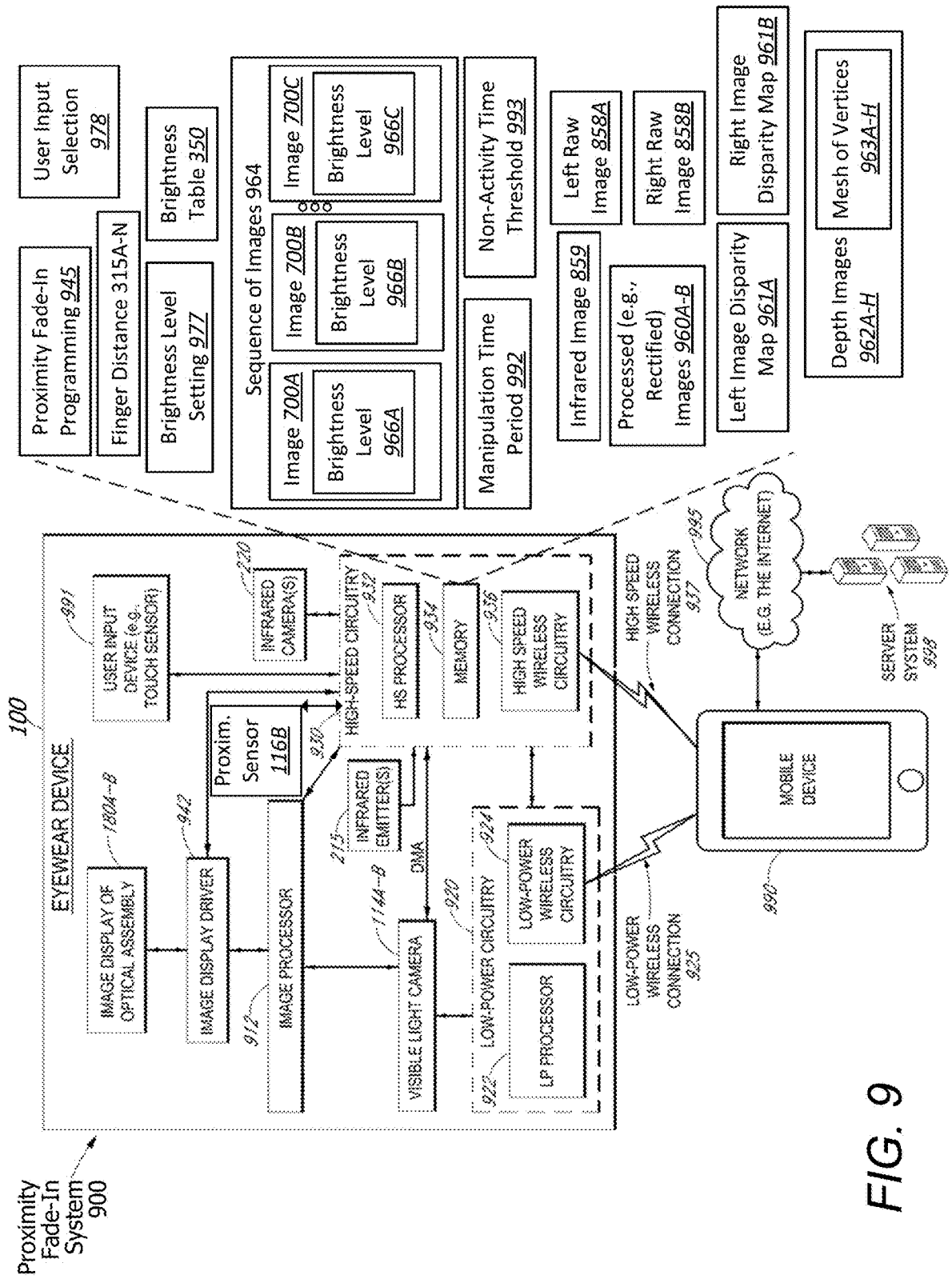
FIG. 9 is a high-level functional block diagram of an example proximity fade-in system including the eyewear device with the proximity sensor, the user input device (e.g., touch sensor or push button), and a depth-capturing camera; a mobile device; and a server system connected via various networks.

FIG. 9 is a high-level functional block diagram of an example proximity fade-in system 900, which includes a wearable device (e.g., the eyewear device 100), a mobile device 990, and a server system 998 connected via various networks. Eyewear device 100 includes a depth-capturing camera, such as at least one of the visible light cameras 114A-B; and the depth sensor 213, shown as infrared emitter 215 and infrared camera 220. The depth-capturing camera can alternatively include at least two visible light cameras 114A-B (one associated with the left lateral side 170A and one associated with the right lateral side 170B). Depth-capturing camera generates depth images 962A-H, which are rendered three-dimensional (3D) models that are texture mapped images of a red, green, and blue (RGB) imaged scene, e.g., derived from the raw images 858A-B and processed (e.g., rectified) images 960A-B.

Mobile device 990 may be a smartphone, tablet, laptop computer, access point, or any other such device capable of connecting with eyewear device 100 using both a low-power wireless connection 925 and a high-speed wireless connection 937. Mobile device 990 is connected to server system 998 and network 995. The network 995 may include any combination of wired and wireless connections.

Eyewear device 100 further includes two image displays of the optical assembly 180A-B (one associated with the left lateral side 170A and one associated with the right lateral side 170B). Eyewear device 100 also includes image display driver 942, image processor 912, low-power circuitry 920, and high-speed circuitry 930. Image display of optical assembly 180A-B are for presenting images and videos, including an image 700A or images 700A-N that can include a graphical user interface to a wearer of the eyewear device 100. Image display driver 942 is coupled to the image display of optical assembly 180A-B to control the image display of optical assembly 180A-B to present the images and videos, such as presented image 700A, and to adjust a brightness level setting 977 of the presented image 700A or images 700A-N.

Image display driver 942 (see FIG. 9) commands and controls the image display of the optical assembly 180A-B. Image display driver 942 may deliver image data directly to the image display of the optical assembly 180A-B for presentation or may have to convert the image data into a signal or data format suitable for delivery to the image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

As noted above, eyewear device 100 includes a frame 105; and a temple 125A-B extending from a lateral side 170A-B of the frame 105. Eyewear device 100 further includes a user input device 991 (e.g., touch sensor 113B or push button 117B) including an input surface 181 on the frame 105, the temple 125A-B, the lateral side 170A-B, or a combination thereof. The user input device 991 (e.g., touch sensor 113B or push button 117B) is to receive from the wearer a user input selection 978 on the input surface 181 to manipulate the graphical user interface of the presented image 700A. Eyewear device 100 further includes a proximity sensor 116B (proxim. sensor 116B) to track a finger distance 315 of a finger of the wearer 310 to the input surface 181.

The components shown in FIG. 9 for the eyewear device 100 are located on one or more circuit boards, for example a PCB or flexible PCB, in the rims or temples. Alternatively or additionally, the depicted components can be located in the chunks, frames, hinges, or bridge of the eyewear device 100. Left and right visible light cameras 114A-B can include digital camera elements such as a complementary metal-oxide-semiconductor (CMOS) image sensor, charge coupled device, a lens, or any other respective visible or light capturing elements that may be used to capture data, including images of scenes with unknown objects.

Eyewear device includes 100 includes a memory 934 which includes proximity fade-in programming 945 to perform a subset or all of the functions described herein for proximity fade-in effects, in which the brightness level setting is adjusted to a darker or brighter setting based on finger distance 315 of the wearer and applied to presented images 700A-N of a sequence of images 964. As shown, memory 934 further includes a left raw image 858A captured by left visible light camera 114A, a right raw image 858B captured by right visible light camera 114B, and an infrared image 859 captured by infrared camera 220 of the depth sensor 213. Memory 934 further includes multiple depth images 962A-H, one for each of eight original images captured by the visible light camera(s) 114A-B. Depth images 962A-H are generated, via the depth-capturing camera, and each of the depth images 962A-H includes a respective mesh of vertices 963A-H.

Figure 11:
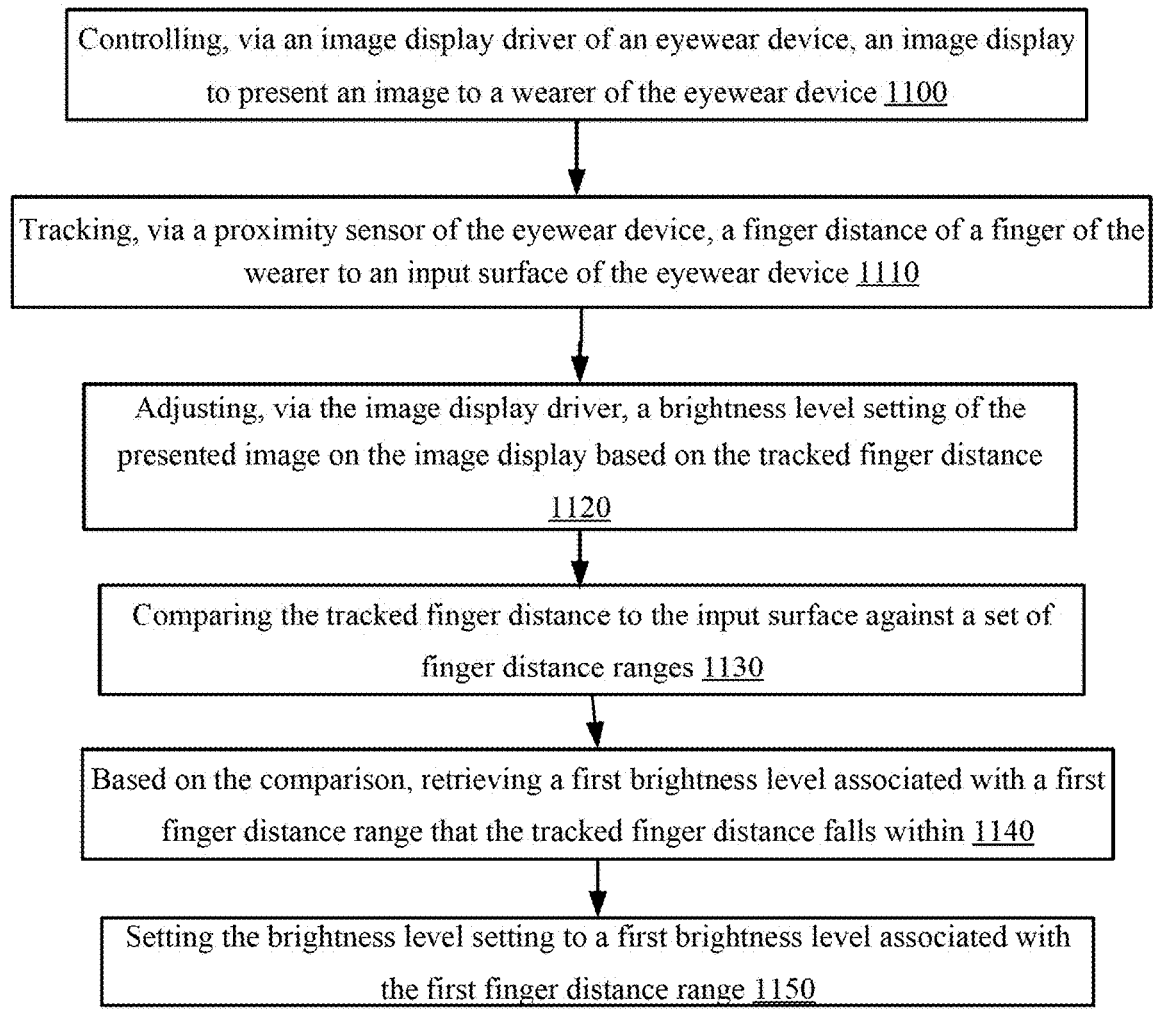
FIG. 11 is a flowchart of a method that can be implemented in the proximity fade-in system to apply to an image or sequence of images that manipulates a brightness level parameter of the image to change the visual perception of radiating or reflecting light.

A flowchart outlining functions which can be implemented in the proximity fade-in programming 945 is shown in FIG. 11. Memory 934 further includes the user input selection 978 (e.g., finger gestures, such as pressing, tapping, scrolling, panning, double tapping, or other detected touch events), which are received by the user input device 991. Memory 934 further includes: a left image disparity map 961A, a right image disparity map 961B, a left processed (e.g., rectified) image 960A and a right processed (e.g., rectified) image 960B (e.g., to remove vignetting towards the end of the lens). As further shown, memory 934 includes the respective mesh of vertices 963A-H for each of the depth images 962A-H; and a sequence of images 964 that includes presented images 700A-N and associated brightness levels 966A-N of respective presented images 700A-N. Memory further includes the brightness table 350 of FIG. 3, the brightness level setting 977, and various tracked finger distances 315A-N.

As shown in FIG. 9, high-speed circuitry 930 includes high-speed processor 932, memory 934, and high-speed wireless circuitry 936. In the example, the image display driver 942 is coupled to the high-speed circuitry 930 and operated by the high-speed processor 932 in order to drive the left and right image displays of the optical assembly 180A-B. High-speed processor 932 may be any processor capable of managing high-speed communications and operation of any general computing system needed for eyewear device 100. High-speed processor 932 includes processing resources needed for managing high-speed data transfers on high-speed wireless connection 937 to a wireless local area network (WLAN) using high-speed wireless circuitry 936. In certain examples, the high-speed processor 932 executes an operating system such as a LINUX operating system or other such operating system of the eyewear device 100 and the operating system is stored in memory 934 for execution. In addition to any other responsibilities, the high-speed processor 932 executing a software architecture for the eyewear device 100 is used to manage data transfers with high-speed wireless circuitry 936. In certain examples, high-speed wireless circuitry 936 is configured to implement Institute of Electrical and Electronic Engineers (IEEE) 802.11 communication standards, also referred to herein as Wi-Fi. In other examples, other high-speed communications standards may be implemented by high-speed wireless circuitry 936.

Low-power wireless circuitry 924 and the high-speed wireless circuitry 936 of the eyewear device 100 can include short range transceivers (Bluetooth™) and wireless wide, local, or wide area network transceivers (e.g., cellular or WiFi). Mobile device 990, including the transceivers communicating via the low-power wireless connection 925 and high-speed wireless connection 937, may be implemented using details of the architecture of the eyewear device 100, as can other elements of network 995.

Memory 934 includes any storage device capable of storing various data and applications, including, among other things, camera data generated by the left and right visible light cameras 114A-B, infrared camera 220, and the image processor 912, as well as images generated for display by the image display driver 942 on the image displays of the optical assembly 180A-B. While memory 934 is shown as integrated with high-speed circuitry 930, in other examples, memory 934 may be an independent standalone element of the eyewear device 100. In certain such examples, electrical routing lines may provide a connection through a chip that includes the high-speed processor 932 from the image processor 912 or low-power processor 922 to the memory 934. In other examples, the high-speed processor 932 may manage addressing of memory 934 such that the low-power processor 922 will boot the high-speed processor 932 any time that a read or write operation involving memory 934 is needed.

As shown in FIG. 9, the processor 932 of the eyewear device 100 can be coupled to the depth-capturing camera (visible light cameras 114A-B; or visible light camera 114A, infrared emitter 215, and infrared camera 220), the image display driver 942, the user input device 991 (e.g., touch sensor 113B or push button 117B), the proximity sensor 116B, and the memory 934.

Execution of the proximity fade-in programming 945 in the memory 934 by the processor 932 configures the eyewear device 100 to perform the following functions. First, eyewear device 100 controls, via the image display driver 942, the image display of optical assembly 180A-B to present the image 700A to the wearer. Second, eyewear device 100, tracks, via the proximity sensor 116B, the finger distance 315 of the finger of the wearer 310 to the input surface 181. Third, eyewear device 100 adjusts, via the image display driver 942, the brightness level setting 977 of the presented image 700A on the image display of optical assembly 180A-B based on the tracked finger distance 315.

As shown in FIG. 9 and previously in FIG. 3F, the memory 934 further includes a brightness table 350 that includes: (i) a set of finger distance ranges 355A-F to the input surface 181, and (ii) a set of brightness levels 355A-F of the presented image 700A. Each respective finger distance range 355A-F is associated with a respective brightness level 360A-F. The function of adjusting, via the image display driver 942, the brightness level setting 977 of the presented image 700A based on the tracked finger distance 315 includes the following functions. First, comparing the tracked finger distance 315 to the input surface 181 against the set of finger distance ranges 355A-F. Second, based on the comparison, retrieving a first brightness level 360A associated with a first finger distance range 355A that the tracked finger distance 315 falls within. Third, setting the brightness level setting 977 to the first brightness level 360A of the first finger distance range 355A.

In a first example, the first finger distance range 355A corresponds to a minimum distance range 355A that indicates direct contact of the finger of the wearer with the input surface 181 to manipulate the graphical user interface. The first brightness level is a maximum bright state 360A in which the brightness level setting 977 of the presented image 700A on the image display of optical assembly 180A-B is set to maximum light output. The function of adjusting, via the image display driver 942, the brightness level setting 977 of the presented image 700A further includes: locking the brightness level setting 977 at the first brightness level 360A for a manipulation time period 992 (e.g., 5 to 60 seconds).

In a second example, the first finger distance range 355F corresponds to a maximum distance range 355F that indicates non-activity such that the eyewear device 100 is not being worn or non-interaction with the graphical user interface by the wearer. The first brightness level is a maximum dark state 360F in which the brightness level setting 977 of the presented image 700A on the image display of optical assembly 180A-B is set to minimum light output or the image display of optical assembly 180A-B is powered off. The function of adjusting, via the image display driver 942, the brightness level setting 977 of the presented image 700A further includes: before setting the brightness level setting 977 to the maximum dark state 360F associated with the maximum distance range 355F, detecting that the tracked finger distance 315 is within the maximum distance range 355F for a non-activity time threshold 993 (e.g., 60 to 300 seconds).

In a third example, the brightness table 350 further includes a second finger distance range 355F associated with a second brightness level 360F. The first finger distance range 355A is less than the second finger distance range 355F, such that the first finger distance range 355A indicates the finger of the wearer is nearer to the input surface 181 compared to the second finger distance range 355F. The first brightness level 360A of the first finger distance range 355A is brighter than the second brightness level 360F, such that the first brightness level 360A indicates the presented image 700A on the image display of optical assembly 180A-B has increased light output compared to the second brightness level 350F.

Continuing the third example, execution of the proximity fade-in programming 945 by the processor 932 further configures the eyewear device 100 to implement the following two functions. First, after adjusting, via the image display driver 942, the brightness level setting 977 of the presented image 700A on the image display of optical assembly 180A-B based on the tracked finger distance 315: eyewear device 100 tracks, via the proximity sensor 116B, a second finger distance 315F (see FIG. 7A) of the finger of the wearer 310 to the input surface 181. Second, eyewear device 100 adjusts, via the image display driver 942, the brightness level setting 977 of the presented image 700A on the image display of optical assembly 180A-B based on the tracked second finger distance 315F by implementing the following steps. First, comparing the tracked second finger distance 315F of the finger of the wearer 310 to the input surface 181 against the set of finger distance ranges 355A-F. Second, based on the comparison, retrieving the second brightness level 360F of the second finger distance range 355F that the tracked second finger distance 315F falls within. Third, setting the brightness level setting 977 to the second brightness level 360F of the second finger distance range 355F.

In a fourth example, the brightness table 350 further includes a third finger distance range 355C associated with a third brightness level 360C. The third finger distance range 355C is greater than the first finger distance range 355A, such that the third finger distance range 355C indicates the finger of the wearer 310 is farther from the input surface 181 compared to the first finger distance range 355A. The third brightness level 360C of the third finger distance range 355C is darker than the first brightness level 360A, such that the third brightness level 360C indicates the presented image 700A on the image display of optical assembly 180A-B has decreased light output compared to the first brightness level 360A.

Continuing the fourth example, execution of the proximity fade-in programming 945 by the processor 932 further configures the eyewear device 100 to implement the following two functions. First, after adjusting, via the image display driver 942, the brightness level setting 977 of the presented image 700A on the image display of optical assembly 180A-B based on the tracked finger distance 315: eyewear device 100 tracks, via the proximity sensor 116B, a third finger distance 315C (see FIG. 7B) of the finger of the wearer 310 to the input surface 181. Second, eyewear device 100 adjusts, via the image display driver 942, the brightness level setting 977 of the presented image 700A on the image display of optical assembly 180A-B based on the tracked third finger distance 315C by implementing the following three steps. First, comparing the tracked third finger distance 315C of the finger of the wearer 310 to the input surface 181 against the set of finger distance ranges 355A-F. Second, based on the comparison, retrieving the third brightness level 360C of the third finger distance range 355C that the tracked third finger distance 315 falls within. Third, setting the brightness level setting 977 to the third brightness level 360C of the third finger distance range 355C.

Eyewear device 100 includes a chunk 110A-B integrated into or connected to the frame 105 on the lateral side 170A-B. The proximity sensor 116B is on the frame 105, the temple 125A-B, or the chunk 110A-B. The proximity sensor 116B includes: a capacitive proximity sensor 416B, a photoelectric proximity sensor 516B, an ultrasonic proximity sensor 616B, or an inductive proximity sensor. The user input device 991 (e.g., touch sensor 113B or push button 117B) is on the frame 105, the temple 125A-B, or the chunk 110A-B. The user input device 991 includes a capacitive touch sensor or a resistive touch sensor 113B.

Figure 10:
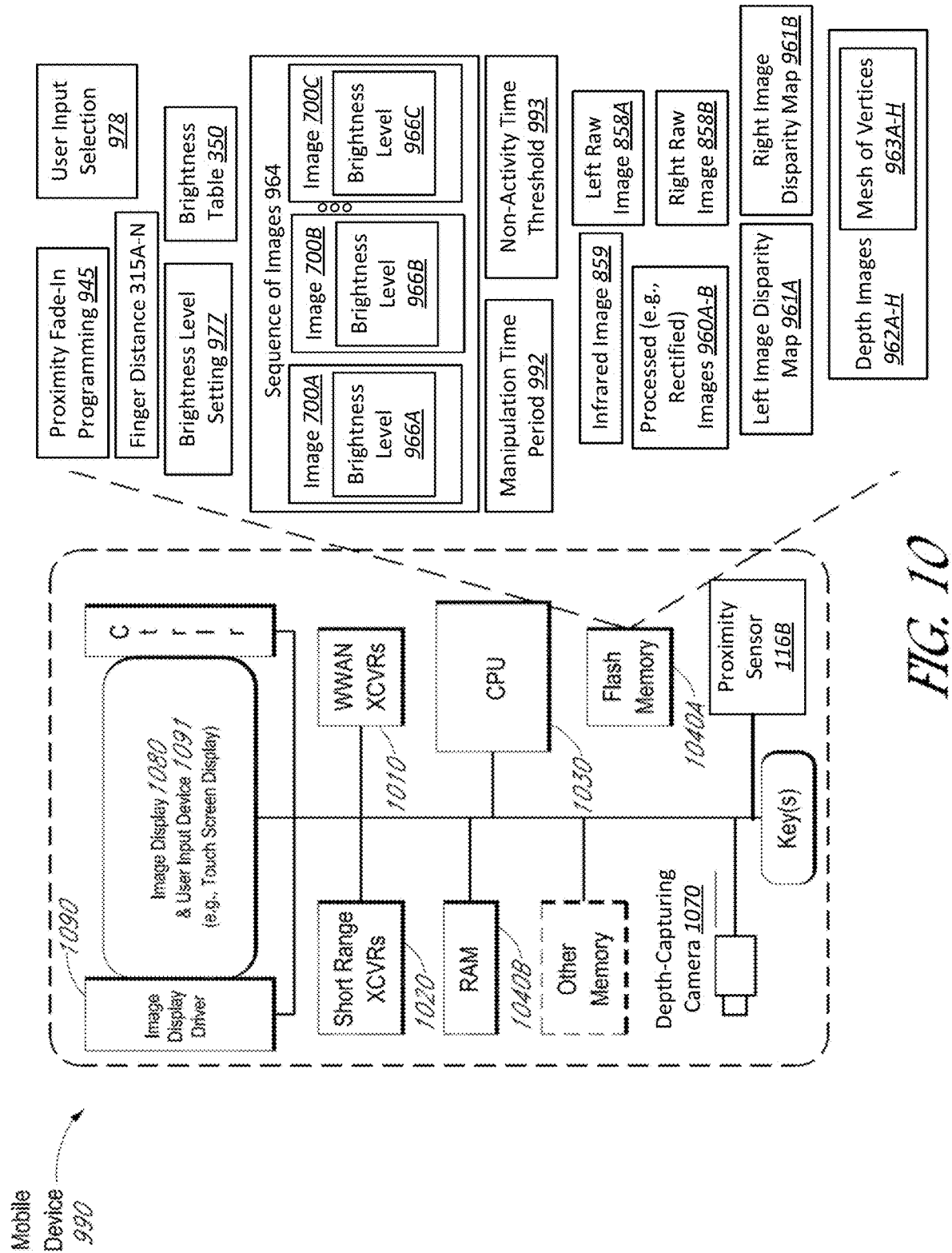
FIG. 10 shows an example of a hardware configuration for the mobile device of the proximity fade-in system of FIG. 9 that supports the proximity fade-in functionality described herein.

As shown in FIG. 10, the processor 1030 of the mobile device 990 can be coupled to the depth-capturing camera 1070, the image display driver 1090, the user input device 1091, the proximity sensor 116B, and the memory 1040A. Eyewear device 100 can perform all or a subset of any of the following functions described below as a result of the execution of the proximity fade-in programming 945 in the memory 934 by the processor 932 of the eyewear device 100. Mobile device 990 can perform all or a subset of any of the following functions described below as a result of the execution of the proximity fade-in programming 945 in the memory 1040A by the processor 1030 of the mobile device 990. Functions can be divided in the proximity fade-in system 900, such that the eyewear device 100 generates the raw images 858A-B, but the mobile device 990 performs the remainder of the image processing on the raw images 858A-B.

In an example, the input surface 181 is formed of plastic, acetate, or another insulating material that forms a substrate of the frame 105, the temple 125A-B, or the lateral side 170A-B. The frame 105, the temple 125A-B, or the chunk 110A-B includes a circuit board 240 that includes the capacitive proximity sensor 416B and the capacitive touch sensor 113B. For example, the circuit board 240 can be a flexible printed circuit board 240. The capacitive proximity sensor 416B and the capacitive touch sensor 113B are disposed on the flexible printed circuit board 240.

In another example, the proximity sensor 116B is the photoelectric proximity sensor 516B. The photoelectric proximity sensor 516B includes an infrared emitter 511 to emit a pattern of infrared light; and an infrared receiver 512 connected to the processor 932. The infrared receiver 512 is configured to measure reflection variations of the pattern of infrared light to track the finger distance 315 of the finger of the wearer 310 to the input surface 181.

Proximity fade-in system 900 further includes a user input device 991, 1091 to receive from the wearer the user input selection 978 (e.g., to manipulate the graphical user interface of the presented image 700A). Proximity fade-in system 900 further includes a memory 934, 1040A; and a processor 932, 1030 coupled to the image display driver 942, 1090 the user input device 991, 1091 and the memory 934, 1040A. Proximity fade-in system 900 further includes proximity fade-in programming 945 in the memory 934, 1040A.

Either the mobile device 990 or eyewear device 100 can include the user input device 991, 1091. A touch-based user input device 1091 can be integrated into the mobile device 990 as a touch screen display. In one example, the user input device 991, 1091 includes a touch sensor including an input surface and a touch sensor array that is coupled to the input surface to receive at least one finger contact inputted from a user. User input device 991, 1091 further includes a touch sensing circuit integrated into or connected to the touch sensor and connected to the processor 932, 1030. The touch sensing circuit is configured to measure voltage to track at least one finger contact on the input surface 181.

A touch-based user input device 991 can be integrated into the eyewear device 100. As noted above, eyewear device 100 includes a chunk 110A-B integrated into or connected to the frame 105 on the lateral side 170A-B of the eyewear device 100. The frame 105, the temple 125A-B, or the chunk 110A-B includes a circuit board that includes the touch sensor. The circuit board includes a flexible printed circuit board. The touch sensor is disposed on the flexible printed circuit board. The touch sensor array is a capacitive array or a resistive array. The capacitive array or the resistive array includes a grid that forms a two-dimensional rectangular coordinate system to track X and Y axes location coordinates.

As noted above, eyewear device 100 includes a frame 105, a temple 125A-B connected to a lateral side 170A-B of the frame 105, and the depth-capturing camera. The depth-capturing camera is supported by at least one of the frame 105 or the temple 125A-B. The depth-capturing camera includes: (i) at least two visible light cameras 114A-B with overlapping fields of view 111A-B, or (ii) a least one visible light camera 114A or 114B and a depth sensor 213. The depth-capturing camera 1070 of the mobile device 990 can be similarly structured.

In one example, the depth-capturing camera includes the at least two visible light cameras 114A-B comprised of a left visible light camera 114A with a left field of view 111A to capture a left raw image 858A and a right visible light camera 114B with a right field of view 111B to capture a right raw image 858B. The left field of view 111A and the right field of view 111B have an overlapping field of view 813 (see FIG. 8B).

The proximity fade-in system 900 further comprises a host computer, such as the mobile device 990, coupled to the eyewear device 100 over the network 925 or 937. The host computer includes a second network communication interface 1010 or 1020 for communication over the network 925 or 937. The second processor 1030 is coupled to the second network communication interface 1010 or 1020. The second memory 1040A is accessible to the second processor 1030. Host computer further includes second proximity fade-in programming 945 in the second memory 1040A to implement the proximity fade-in functionality described herein.

Server system 998 may be one or more computing devices as part of a service or network computing system, for example, that include a processor, a memory, and network communication interface to communicate over the network 995 with the mobile device 990 and eyewear device 100. Eyewear device 100 is connected with a host computer. For example, the eyewear device 100 is paired with the mobile device 990 via the high-speed wireless connection 937 or connected to the server system 998 via the network 995.

Output components of the eyewear device 100 include visual components, such as the left and right image displays of optical assembly 180A-B as described in FIGS. 1E-F (e.g., a display such as a liquid crystal display (LCD), a plasma display panel (PDP), a light emitting diode (LED) display, a projector, or a waveguide). The image displays of the optical assembly 180A-B are driven by the image display driver 942. The output components of the eyewear device 100 further include acoustic components (e.g., speakers), haptic components (e.g., a vibratory motor), other signal generators, and so forth. The input components of the eyewear device 100, the mobile device 990, and server system 998, such as the user input device 991, 1091 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Eyewear device 100 may optionally include additional peripheral device elements. Such peripheral device elements may include biometric sensors, additional sensors, or display elements integrated with eyewear device 100. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 925 and 937 from the mobile device 990 via the low-power wireless circuitry 924 or high-speed wireless circuitry 936.

FIG. 10 is a high-level functional block diagram of an example of a mobile device 990 that communicates via the proximity fade-in system 900 of FIG. 9. Mobile device 990 includes a user input device 1091 (e.g., a touch screen display) to receive a user input selection 978. Mobile device 990 includes a flash memory 1040A which includes proximity fade-in programming 945 to perform all or a subset of the functions described herein for producing proximity fade-in functionality, as previously described.

As shown, memory 1040A further includes a left raw image 858A captured by left visible light camera 114A, a right raw image 858B captured by right visible light camera 114B, and an infrared image 859 captured by infrared camera 220 of the depth sensor 213. Mobile device 1090 can include a depth-capturing camera 1070 that comprises at least two visible light cameras (first and second visible light cameras with overlapping fields of view) or at least on visible light camera and a depth sensor with substantially overlapping fields of view like the eyewear device 100. When the mobile device 990 includes components like the eyewear device 100, such as the depth-capturing camera, the left raw image 858A, the right raw image 858B, and the infrared image 859 can be captured via the depth-capturing camera 1070 of the mobile device 990.

Memory 1040A further includes multiple depth images 962A-H (including respective meshes of vertices 963A-H), which are generated, via the depth-capturing camera of the eyewear device 100 or via the depth-capturing camera 1070 of the mobile device 990 itself. A flowchart outlining functions which can be implemented in the proximity fade-in programming 945 is shown in FIG. 11. Memory 1040A further includes: a left image disparity map 961A, a right image disparity map 961B, and left processed (e.g., rectified) and right processed (e.g., rectified) images 960A-B (e.g., to remove vignetting towards the end of the lens). As further shown, memory 1040A includes the user input selection 978, tracked finger distances 315A-N, brightness level setting 977, brightness table 350, sequence of images 964 (including images 700A-N and associated brightness levels 966A-N).

As shown, the mobile device 990 includes an image display 1080, an image display driver 1090 to control the image display, and a user input device 1091 similar to the eyewear device 100. In the example of FIG. 10, the image display 1080 and user input device 1091 are integrated together into a touch screen display.

Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 10 therefore provides block diagram illustrations of the example mobile device 990 having a touch screen display for displaying content and receiving user input as (or as part of) the user interface.

The activities that are the focus of discussions here typically involve data communications related to proximity fade-in of presented images 700A-N and receiving the user input selection 978 in the portable eyewear device 100 or the mobile device 990. As shown in FIG. 10, the mobile device 990 includes at least one digital transceiver (XCVR) 1010, shown as WWAN XCVRs, for digital wireless communications via a wide area wireless mobile communication network. The mobile device 990 also includes additional digital or analog transceivers, such as short range XCVRs 1020 for short-range network communication, such as via NFC, VLC, DECT, ZigBee, Bluetooth™, or WiFi. For example, short range XCVRs 1020 may take the form of any available two-way wireless local area network (WLAN) transceiver of a type that is compatible with one or more standard protocols of communication implemented in wireless local area networks, such as one of the Wi-Fi standards under IEEE 802.11 and WiMAX.

To generate location coordinates for positioning of the mobile device 990, the mobile device 990 can include a global positioning system (GPS) receiver. Alternatively, or additionally the mobile device 990 can utilize either or both the short range XCVRs 1020 and WWAN XCVRs 1010 for generating location coordinates for positioning. For example, cellular network, WiFi, or Bluetooth™ based positioning systems can generate very accurate location coordinates, particularly when used in combination. Such location coordinates can be transmitted to the eyewear device over one or more network connections via XCVRs 1010, 1020.

The transceivers 1010, 1020 (network communication interfaced) conform to one or more of the various digital wireless communication standards utilized by modern mobile networks. Examples of WWAN transceivers 1010 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 1010, 1020 provide two-way wireless communication of information including digitized audio signals, still image and video signals, web page information for display as well as web related inputs, and various types of mobile message communications to/from the mobile device 990 for proximity fade-in effects.

Several of these types of communications through the transceivers 1010, 1020 and a network, as discussed previously, relate to protocols and procedures in support of communications with the eyewear device 100 or the server system 998 for generating images, such as transmitting left raw image 858A, right raw image 858B, infrared image 859, depth images 962A-H, and processed (e.g., rectified) images 960A-B. Such communications, for example, may transport packet data via the short range XCVRs 1020 over the wireless connections 925 and 937 to and from the eyewear device 100 as shown in FIG. 9. Such communications, for example, may also transport data utilizing IP packet data transport via the WWAN XCVRs 1010 over the network (e.g., Internet) 995 shown in FIG. 9. Both WWAN XCVRs 1010 and short range XCVRs 1020 connect through radio frequency (RF) send-and-receive amplifiers (not shown) to an associated antenna (not shown).

The mobile device 990 further includes a microprocessor, shown as CPU 1030, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 1030, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU 1030 or processor hardware in smartphone, laptop computer, and tablet.

The microprocessor 1030 serves as a programmable host controller for the mobile device 990 by configuring the mobile device 990 to perform various operations, for example, in accordance with instructions or proximity fade-in programming executable by processor 1030. For example, such operations may include various general operations of the mobile device, as well as operations related to the proximity fade-in programming 945 and communications with the eyewear device 100 and server system 998. Although a processor may be configured by use of hardwired logic, typical processors in mobile devices are general processing circuits configured by execution of proximity fade-in programming 945.

The mobile device 990 includes a memory or storage device system, for storing data and proximity fade-in programming. In the example, the memory system may include a flash memory 1040A and a random access memory (RAM) 1040B. The RAM 1040B serves as short term storage for instructions and data being handled by the processor 1030, e.g. as a working data processing memory. The flash memory 1040A typically provides longer term storage.

Hence, in the example of mobile device 990, the flash memory 1040A is used to store proximity fade-in programming 945 or instructions for execution by the processor 1030. Depending on the type of device, the mobile device 990 stores and runs a mobile operating system through which specific applications, including proximity fade-in programming 945, are executed. Applications, such as the proximity fade-in programming 945, may be a native application, a hybrid application, or a web application (e.g., a dynamic web page executed by a web browser) that runs on mobile device 990. Examples of mobile operating systems include Google Android, Apple iOS (I-Phone or iPad devices), Windows Mobile, Amazon Fire OS, RIM BlackBerry operating system, or the like.

It will be understood that the mobile device 990 is just one type of host computer in the proximity fade-in system 900 and that other arrangements may be utilized. For example, a server system 998, such as that shown in FIG. 9, may generate the depth images 962A-H after generation of the raw images 858A-B, via the depth-capturing camera of the eyewear device 100.

FIG. 11 is a flowchart of a method that can be implemented in the proximity fade-in system 900 to apply to an image 700A or sequence of images 700A-N that manipulates a brightness level parameter 966A-N of the image 700A-N to change the visual perception of radiating or reflecting light. Beginning in block 1100, the method includes a step of controlling, via an image display driver 942 of an eyewear device 100, an image display of optical assembly 180A-B to present an image to a wearer of the eyewear device 100.

Proceeding now to block 1110, the method further includes a step of tracking, via a proximity sensor 116B of the eyewear device 100, a finger distance 315 of a finger of the wearer 310 to an input surface 181 of the eyewear device 100. Continuing to block 1120, the method further includes a step of adjusting, via the image display driver 942, a brightness level setting 977 of the presented image 700A on the image display of optical assembly 180A-B based on the tracked finger distance 315.

Block 1120, specifically the step of adjusting, via the image display driver 942, the brightness level setting 977 of the presented image 700A based on the tracked finger distance 315, includes the steps shown in blocks 1130, 1140, and 1150. As shown in block 1130, the method includes comparing the tracked finger distance 315 to the input surface 181 against a set of finger distance ranges 355A-F. Moving to block 1140, the method further includes based on the comparison, retrieving a first brightness level 360A associated with a first finger distance range 355A that the tracked finger distance 315 falls within. Finishing now in block 1150, the method further includes setting the brightness level setting 977 to a first brightness level 360A associated with the first finger distance range 355A.

In a first example, the first finger distance range 355A corresponds to a minimum distance range 355A that indicates direct contact of the finger of the wearer 310 with the input surface 181 to manipulate the graphical user interface. The first brightness level 360A is a maximum bright state 360A in which the brightness level setting 977 of the presented image 700A on the image display of optical assembly 180A-B is set to maximum light output. The step of adjusting, via the image display driver 942, the brightness level setting 977 of the presented image 700A further includes: locking the brightness level setting 977 at the first brightness level 360A for a manipulation time period 992 (e.g., 5 to 60 seconds).

In a second example, the first finger distance range 355A corresponds to a maximum distance range 355F that indicates non-activity such that the eyewear device 100 is not being worn or non-interaction with the graphical user interface by the wearer. The first brightness level 360A is a maximum dark state 360F in which the brightness level setting 977 of the presented image 700A on the image display of optical assembly 180A-B is set to minimum light output or the image display of optical assembly 180A-B is powered off. The step of adjusting, via the image display driver 942, the brightness level setting 977 of the presented image 700A further includes: before setting the brightness level setting 977 to the maximum dark state 360F associated with the maximum distance range 355F, detecting that the tracked finger distance 315 is within the maximum distance range 355F for a non-activity time threshold 993 (e.g., 60 to 300 seconds).

As noted above, the user input device 991 can be a capacitive touch sensor 113B. The proximity sensor 116B can be a capacitive proximity sensor 416B that includes: a conductive plate 320 and a proximity sensing circuit 325 connected to the processor 932. The proximity sensing circuit 325 can be configured to measure voltage to track the finger distance 315 of the finger of the wearer 310 to the conductive plate 320.

Any of the proximity fade-in effect functionality described herein for the eyewear device 100, mobile device 990, and server system 998 can be embodied in one or more applications as described previously. According to some examples, "function," "functions," "application," "applications," "instruction," "instructions," or "proximity fade-in programming" are program(s) that execute functions defined in the programs. Various proximity fade-in programming languages can be employed to create one or more of the applications, structured in a variety of manners, such as object-oriented proximity fade-in programming languages (e.g., Objective-C, Java, or C++) or procedural proximity fade-in programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read proximity fade-in programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An eyewear device comprising:
   an image display to present an image that includes a graphical user interface to a wearer of the eyewear device;
   an image display driver coupled to the image display to control the presented image and adjust a brightness level setting of the presented image;
   a frame;
   a temple extending from a lateral side of the frame;
   a user input device including an input surface on the frame, the temple, the lateral side, or a combination thereof, the user input device to receive from the wearer a user input selection on the input surface to manipulate the graphical user interface of the presented image;
   a proximity sensor to track a finger distance of a finger of the wearer to the input surface;
   a memory;
   a processor coupled to the image display driver, the user input device, the proximity sensor, and the memory; and
   proximity fade-in programming in the memory, wherein execution of the proximity fade-in programming by the processor configures the eyewear device to perform functions, including functions to:
      control, via the image display driver, the image display to present the image to the wearer;
      track, via the proximity sensor, the finger distance of the finger of the wearer to the input surface; and
      adjust, via the image display driver, the brightness level setting of the presented image on the image display based on the tracked finger distance being within respective distance ranges from the input surface to fade-in the image including the graphical user interface as the tracked finger approaches the input surface and to fade-out the image as the tracked finger moves away from the input surface.

2. The eyewear device of claim 1, wherein:
   the memory further includes a brightness table that includes: (i) a set of finger distance ranges to the input surface, and (ii) a set of brightness levels of the presented image, such that each respective finger distance range is associated with a respective brightness level; and the function of adjusting, via the image display driver, the brightness level setting of the presented image based on the tracked finger distance includes:

comparing the tracked finger distance to the input surface against the set of finger distance ranges;

based on the comparison, retrieving a first brightness level associated with a first finger distance range that the tracked finger distance falls within; and setting the brightness level setting to the first brightness level of the first finger distance range.

3. The eyewear device of claim 2, wherein:

the first finger distance range corresponds to a minimum distance range that indicates direct contact of the finger of the wearer with the input surface to manipulate the graphical user interface;

the first brightness level is a maximum bright state in which the brightness level setting of the presented image on the image display is set to maximum light output; and the function of adjusting, via the image display driver, the brightness level setting of the presented image further includes:

locking the brightness level setting at the first brightness level for a manipulation time period.

4. The eyewear device of claim 2, wherein:

the first finger distance range corresponds to a maximum distance range that indicates non-activity such that the eyewear device is not being worn or non-interaction with the graphical user interface by the wearer;

the first brightness level is a maximum dark state in which the brightness level setting of the presented image on the image display is set to minimum light output or the image display is powered off; and the function of adjusting, via the image display driver, the brightness level setting of the presented image further includes:

before setting the brightness level setting to the maximum dark state associated with the maximum distance range, detecting that the tracked finger distance is within the maximum distance range for a non-activity time threshold.

5. The eyewear device of claim 2, wherein:

the brightness table further includes a second finger distance range associated with a second brightness level;

the first finger distance range is less than the second finger distance range, such that the first finger distance range indicates the finger of the wearer is nearer to the input surface compared to the second finger distance range; and the first brightness level of the first finger distance range is brighter than the second brightness level, such that the first brightness level indicates the presented image on the image display has increased light output compared to the second brightness level.

6. The eyewear device of claim 5, wherein:

execution of the proximity fade-in programming by the processor further configures the eyewear device to:

after adjusting, via the image display driver, the brightness level setting of the presented image on the image display based on the tracked finger distance: track, via the proximity sensor, a second finger distance of the finger of the wearer to the input surface; and adjust, via the image display driver, the brightness level setting of the presented image on the image display based on the tracked second finger distance by:

comparing the tracked second finger distance of the finger of the wearer to the input surface against the set of finger distance ranges;

based on the comparison, retrieving the second brightness level of the second finger distance range that the tracked second finger distance falls within; and setting the brightness level setting to the second brightness level of the second finger distance range.

7. The eyewear device of claim 5, wherein:

the brightness table further includes a third finger distance range associated with a third brightness level;

the third finger distance range is greater than the second finger distance range, such that the third finger distance range indicates the finger of the wearer is farther from the input surface compared to the second finger distance range; and the third brightness level of the third finger distance range is darker than the second brightness level, such that the third brightness level indicates the presented image on the image display of optical assembly has decreased light output compared to the second brightness level.

8. The eyewear device of claim 7, wherein:

execution of the proximity fade-in programming by the processor further configures the eyewear device to:

after adjusting, via the image display driver, the brightness level setting of the presented image on the image display of optical assembly based on the tracked finger distance: track, via the proximity sensor, a third finger distance of the finger of the wearer to the input surface; and adjust, via the image display driver, the brightness level setting of the presented image on the image display of optical assembly based on the tracked third finger distance by:

comparing the tracked third finger distance of the finger of the wearer to the input surface against the set of finger distance ranges;

based on the comparison, retrieving the third brightness level of the third finger distance range that the tracked third finger distance falls within; and setting the brightness level setting to the third brightness level of the third finger distance range.

9. The eyewear device of claim 1, further comprising:

a chunk integrated into or connected to the frame on the lateral side;

wherein:

the proximity sensor is on the frame, the temple, or the chunk;

the proximity sensor includes:

a capacitive proximity sensor, a photoelectric proximity sensor, an ultrasonic proximity sensor, or an inductive proximity sensor;

the user input device is on the frame, the temple, or the chunk; and the user input device includes a capacitive touch sensor or a resistive touch sensor.

10. The eyewear device of claim 9, wherein:

the user input device is the capacitive touch sensor;

the proximity sensor is the capacitive proximity sensor and includes:

a conductive plate; and a proximity sensing circuit connected to the processor, the proximity sensing circuit configured to measure voltage to track the finger distance of the finger of the wearer to the conductive plate.

11. The eyewear device of claim 10, wherein:
the proximity sensing circuit of the capacitive proximity sensor includes:
   an oscillating circuit electrically connected to the conductive plate to produce oscillations with varying amplitudes corresponding to the measured voltage; and
   an output switching device to convert the oscillations into the measured voltage and to convey the measured voltage to the processor; and
execution of the proximity fade-in programming by the processor further configures the eyewear device to convert the measured voltage into the tracked finger distance.

12. The eyewear device of claim 10, wherein:
the capacitive proximity sensor is integrated into or connected to the capacitive touch sensor.

13. The eyewear device of claim 10, wherein:
the input surface is formed of plastic, acetate, or another insulating material that forms a substrate of the frame, the temple, or the lateral side; and
the frame, the temple, or the chunk includes a circuit board that includes the capacitive proximity sensor and the capacitive touch sensor.

14. The eyewear device of claim 13, wherein:
the chunk includes the circuit board;
the circuit board is a flexible printed circuit board; and
the capacitive proximity sensor and the capacitive touch sensor are disposed on the flexible printed circuit board.

15. The eyewear device of claim 9, wherein:
the proximity sensor is the photoelectric proximity sensor and includes:
   an infrared emitter to emit a pattern of infrared light; and
   an infrared receiver connected to the processor, the infrared receiver configured to measure reflection variations of the pattern of infrared light to track the finger distance of the finger of the wearer to the input surface.

16. A method comprising steps of:
controlling, via an image display driver of an eyewear device, an image display to present an image including a graphical user interface to a wearer of the eyewear device;
tracking, via a proximity sensor of the eyewear device, a finger distance of a finger of the wearer to an input surface to manipulate the graphical user interface of the eyewear device; and
adjusting, via the image display driver, a brightness level setting of the presented image on the image display based on the tracked finger distance being within respective distance ranges from the input surface to fade-in the image including the graphical user interface as the tracked finger approaches the input surface and to fade-out the image as the tracked finger moves away from the input surface.

17. The method of claim 16, wherein:
the step of adjusting, via the image display driver, the brightness level setting of the presented image based on the tracked finger distance includes:
   comparing the tracked finger distance to the input surface against a set of finger distance ranges;
   based on the comparison, retrieving a first brightness level associated with a first finger distance range that the tracked finger distance falls within; and
   setting the brightness level setting to a first brightness level associated with the first finger distance range.

18. The method of claim 17, wherein:
the first finger distance range corresponds to a minimum distance range that indicates direct contact of the finger of the wearer with the input surface to manipulate the graphical user interface of the eyewear device;
the first brightness level is a maximum bright state in which the brightness level setting of the presented image on the image display is set to maximum light output; and
the step of adjusting, via the image display driver, the brightness level setting of the presented image further includes:
   locking the brightness level setting at the first brightness level for a manipulation time period.

19. The method of claim 17, wherein:
the first finger distance range corresponds to a maximum distance range that indicates non-activity such that the eyewear device is not being worn or non-interaction with the graphical user interface of the eyewear device by the wearer;
the first brightness level is a maximum dark state in which the brightness level setting of the presented image on the image display is set to minimum light output or the image display is powered off; and
the step of adjusting, via the image display driver, the brightness level setting of the presented image further includes:
   before setting the brightness level setting to the maximum dark state associated with the maximum distance range, detecting that the tracked finger distance is within the maximum distance range for a non-activity time threshold.

20. The method of claim 16, wherein:
the input surface is a capacitive touch sensor;
the proximity sensor is a capacitive proximity sensor and includes:
   a conductive plate; and
   a sensing circuit connected to the processor; and
   the step of tracking, via the proximity sensor of the eyewear device, the finger distance of the finger of the wearer to the input surface of the eyewear device further includes:
   the sensing circuit measuring voltage to track the finger distance of the finger of the wearer to the conductive plate.

* * * * *